United States Patent
Jiao et al.

(10) Patent No.: US 12,556,345 B2
(45) Date of Patent: Feb. 17, 2026

(54) ENHANCED CHANNEL STATE INFORMATION (CSI) COMMUNICATION METHOD AND APPARATUS

(71) Applicant: Huawei Technologies Co., Ltd., Guangdong (CN)

(72) Inventors: Chunxu Jiao, Shanghai (CN); Zhengzheng Xiang, Shanghai (CN); Wenting Guo, Shenzhen (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 18/157,660

(22) Filed: Jan. 20, 2023

(65) Prior Publication Data
US 2023/0171071 A1    Jun. 1, 2023

Related U.S. Application Data

(63) Continuation of application No. PCT/CN2021/107998, filed on Jul. 22, 2021.

(30) Foreign Application Priority Data

Jul. 27, 2020    (CN) .................... 202010733656.X

(51) Int. Cl.
*H04L 5/00*    (2006.01)
(52) U.S. Cl.
CPC .................. *H04L 5/0057* (2013.01)
(58) Field of Classification Search
None
See application file for complete search history.

(56) References Cited

U.S. PATENT DOCUMENTS

| 11,889,391 B2 * | 1/2024 | Shan ...................... H04W 12/08 |
| 2013/0182594 A1 | 7/2013 | Kim et al. |

(Continued)

FOREIGN PATENT DOCUMENTS

| CN | 110086582 A | 8/2019 |
| EP | 3493422 A4 | 3/2020 |

(Continued)

OTHER PUBLICATIONS

Huawei, HiSilicon, Remaining details of physical layer procedures for sidelink. 3GPP TSG RAN WG1 Meeting #100-e , Feb. 24-Mar. 6, 2020, R1-2000187, 23 pages.

(Continued)

*Primary Examiner* — Otis L Thompson, Jr.
(74) *Attorney, Agent, or Firm* — WOMBLE BOND DICKINSON (US) LLP

(57) ABSTRACT

A system and method includes: sending a channel state information-reference signal CSI-RS to a second terminal device, where a frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap in time domain. According to the method and apparatus in the embodiments of this application, a first terminal device can obtain channel state information CSI of each sub-channel in the resource pool, and allocate a resource based on the CSI of each sub-channel in the resource pool, improving a communication capacity in an SL scenario.

19 Claims, 11 Drawing Sheets

Sub-channel with SL CSI-RS

Time-frequency resource occupied by SL CSI-RS

(56) References Cited

U.S. PATENT DOCUMENTS

| | | | |
|---|---|---|---|
| 2014/0029458 A1* | 1/2014 | Ye | H04L 5/0035 370/252 |
| 2015/0146633 A1* | 5/2015 | Kalhan | H04W 4/70 370/329 |
| 2018/0302803 A1* | 10/2018 | Ramachandra | H04W 56/001 |
| 2019/0036738 A1* | 1/2019 | Miao | H04L 25/02 |
| 2020/0022089 A1* | 1/2020 | Guo | H04W 52/242 |
| 2020/0374031 A1* | 11/2020 | Baldemair | H04L 1/003 |
| 2021/0051500 A1* | 2/2021 | Chae | H04L 5/0048 |
| 2021/0067290 A1* | 3/2021 | Chen | H04L 5/0033 |
| 2021/0099918 A1* | 4/2021 | Sarkis | H04W 28/26 |
| 2021/0105055 A1* | 4/2021 | Chae | H04L 5/0057 |
| 2021/0136742 A1* | 5/2021 | Huang | H04L 1/1822 |
| 2021/0168814 A1* | 6/2021 | Chen | H04W 72/02 |
| 2021/0212106 A1* | 7/2021 | Farag | H04W 72/23 |
| 2021/0321369 A1* | 10/2021 | Chen | H04W 76/27 |
| 2021/0368372 A1* | 11/2021 | Chen | H04W 24/08 |
| 2022/0015072 A1* | 1/2022 | Hwang | H04W 56/001 |
| 2022/0053513 A1* | 2/2022 | Ryu | H04L 1/0025 |
| 2022/0150730 A1* | 5/2022 | Freda | H04W 24/04 |
| 2022/0167359 A1* | 5/2022 | Miao | H04L 5/0057 |
| 2022/0174655 A1* | 6/2022 | Tsai | H04W 72/20 |
| 2022/0201528 A1* | 6/2022 | Shin | H04L 5/0053 |
| 2022/0210804 A1* | 6/2022 | Hwang | H04L 5/0053 |
| 2022/0225295 A1* | 7/2022 | Sartori | H04W 76/14 |
| 2022/0255680 A1* | 8/2022 | Moon | H04W 72/21 |
| 2022/0329301 A1* | 10/2022 | Shin | H04W 72/02 |
| 2022/0399927 A1* | 12/2022 | Tsai | H04B 7/0617 |
| 2023/0164815 A1* | 5/2023 | Liu | H04L 5/0044 370/329 |
| 2023/0319745 A1* | 10/2023 | Liu | H04W 72/1263 370/503 |
| 2023/0354311 A1* | 11/2023 | Xue | H04L 5/0044 |
| 2023/0361955 A1* | 11/2023 | Ganesan | H04B 7/06966 |
| 2024/0260001 A1* | 8/2024 | Elshafie | H04W 72/20 |

FOREIGN PATENT DOCUMENTS

| | | |
|---|---|---|
| WO | 2020055184 A1 | 3/2020 |
| WO | 2020153998 A1 | 7/2020 |

OTHER PUBLICATIONS

3GPP TS 38.214 V16.0.0 (Dec. 2019), 3rd Generation Partnership Project; Technical Specification Group Radio Access Network; NR; Physical layer procedures for data(Release 16), 147 pages.

OPPO, Physical layer structure for NR-V2X. 3GPP TSG RAN WG1 #97, Reno, USA, May 13 17, 2019, R1-1906472, 12 pages.

3GPP TS 38.321 V15.8.0 (Dec. 2019), 3rd Generation Partnership Project; Technical Specification Group Radio Access Network; NR; Medium Access Control (MAC) protocol specification(Release 15), 78 pages.

3GPP TS 38.331 V15.7.0 (Sep. 2019), 3rd Generation Partnership Project; Technical Specification Group Radio Access Network; NR; Radio Resource Control (RRC) protocol specification(Release 15), 527 pages.

NEC: "Support of unicast, groupcast and broadcast in NR V2X", 3GPP Draft; R1-1810807,Sep. 28, 2018, XP051518212,total 4 pages.

AAPPLE: "On Remaining Details of NR V2X Physical Layer Structure", 3GPP Draft; R1-2002323, Apr. 11, 2020, pp. 1-10,XP051875543, total 10 pages.

VIVO: "Remaining issues on physical layer structure for NR sidelink", 3GPP Draft; R1-2001659,Apr. 10, 2020, XP051873257, total 17 pages.

ZTE et al: "Remaining issues of NR sidelink physical layer structure", 3GPP Draft; R1-2001577,Apr. 11, 2020, XP051875168, total 10 pages.

\* cited by examiner

Channel measurement in a DL (downlink)

Channel measurement in an SL (sidelink)

Sub-channel with SL CSI-RS

Time-frequency resource occupied by SL CSI-RS

| RI (rank indicator) + wideband (wideband) CQI (channel quality indicator) | | | | | | | | Oct 1 |
|---|---|---|---|---|---|---|---|---|
| T7 | T6 | T5 | T4 | T3 | T2 | T1 | T0 | Oct 2 |

FIG. 7

| RI | | | | T3 | T2 | T1 | T0 | Oct 1 |
|---|---|---|---|---|---|---|---|---|
| T11 | T10 | T9 | T8 | T7 | T6 | T5 | T4 | Oct 2 |
| R | | | | T15 | T14 | T13 | T12 | Oct 3 |

FIG. 8

| RI | | | | | | | | Oct 1 |
|---|---|---|---|---|---|---|---|---|
| T7 | T6 | T5 | T4 | T3 | T2 | T1 | T0 | Oct 2 |
| T15 | T14 | T13 | T12 | T11 | T10 | T9 | T8 | Oct 3 |

FIG. 9

ENHANCED CHANNEL STATE INFORMATION (CSI) COMMUNICATION METHOD AND APPARATUS

CROSS-REFERENCE TO RELATED APPLICATIONS

This application is a continuation of International Application No. PCT/CN2021/107998, filed on Jul. 22, 2021, which claims priority to Chinese Patent Application No. 202010733656.X, filed on Jul. 27, 2020. The disclosures of the aforementioned applications are hereby incorporated by reference in their entireties.

TECHNICAL FIELD

This application relates to the field of communication technologies, and in particular, to a communication method and apparatus.

BACKGROUND

In the past decades, wireless communication systems have undergone a technological evolution from first generation analog communication to new radio (NR). In a wireless communication system, a channel state information (CSI) procedure is introduced to achieve an objective such as channel measurement. A receive end calculates CSI based on a channel state information-reference signal (CSI-RS) received from a transmit end, and feeds back the CSI to the transmit end.

Currently, there are at least two CSI solutions. The first CSI solution is a Uu interface CSI solution, in which measurement is mainly performed at a granularity of a sub-band. Because the concept of sub-band is not introduced for sidelink (SL), the CSI solution at a granularity of a sub-band is not suitable for the SL. The second CSI solution is a PC5 interface SL CSI solution introduced in a 3rd generation partnership project (3GPP) R16 release protocol. In the SL CSI solution, a frequency-domain bandwidth of an SL CSI-RS needs to be the same as a frequency-domain bandwidth of a physical sidelink shared channel (PSSCH) associated with the SL CSI-RS. In this way, the receive end can measure and calculate only a CSI on an SL CSI-RS frequency band based on the SL CSI-RS, that is, can measure and calculate only a CSI on one or more sub-channels corresponding to the PSSCH associated with the SL CSI-RS. Further, the transmit end can obtain only the CSI on the one or more sub-channels corresponding to the PSSCH associated with the SL CSI-RS. This is not conducive for the transmit end to allocate a resource based on the CSI, and an SL communication requirement cannot be met.

As can be learned, none of the existing CSI solutions can meet the SL communication requirement.

SUMMARY

Embodiments of this application provide a communication method and apparatus, which may be applied to internet of vehicles, for example, vehicle to everything (V2X) communication, a long term evolution-vehicle (LTE-V) technology, and vehicle to vehicle (V2V) communication; or may be applied to fields such as smart driving and an intelligent connected vehicle, improving a communication capacity in an SL scenario.

To achieve the foregoing objective, the following technical solutions are used in the embodiments of this application.

In some embodiments, this application provides a communication method. The method may be performed by a first terminal device. The method includes: sending a channel state information-reference signal CSI-RS to a second terminal device, where a frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap in time domain.

In this way, according to the communication method provided in this embodiment of this application, in an SL scenario, the frequency-domain bandwidth of the CSI-RS is the same as the frequency-domain bandwidth of the resource pool, in other words, a quantity of sub-channels included in the CSI-RS in frequency domain is the same as a quantity of sub-channels included in the resource pool in frequency domain. Therefore, after the first terminal device sends the CSI-RS to the second terminal device, the second terminal device can measure and feed back CSI of each sub-channel in the resource pool to the first terminal device based on the CSI-RS. Further, the first terminal device can properly select a frequency domain resource based on the CSI of each sub-channel in the resource pool, improving a communication capacity in the SL scenario. According to some embodiments, according to the communication method provided in this embodiment of this application, in the SL scenario, when determining that one or more sub-channels currently used for transmission have relatively poor channel quality and cannot implement reliable transmission, the first terminal device can select another proper sub-channel for transmission based on the CSI of each sub-channel in the resource pool, improving transmission reliability in the SL scenario.

In some embodiments, the method further includes: sending first indication information to the second terminal device, where the first indication information is used to indicate the second terminal device to send channel state information CSI, and the first indication information is included in $2^{nd}$ stage sidelink control information SCI.

In some embodiments, the first indication information is further used to indicate that the frequency-domain bandwidth of the CSI-RS is the same as the frequency-domain bandwidth of the resource pool.

In some embodiments, the method further includes: sending second indication information to the second terminal device, where the second indication information is used to indicate that the frequency-domain bandwidth of the CSI-RS is the same as the frequency-domain bandwidth of the resource pool.

In some embodiments, the second indication information is included in radio resource control RRC signaling.

According to the method provided in this embodiment of this application, the RRC signaling or the first indication information is used to indicate that a frequency-domain bandwidth of an SL CSI-RS is the same as the frequency-domain bandwidth of the resource pool. The frequency-domain bandwidth of the CSI-RS is the same as the frequency-domain bandwidth of the resource pool, in other words, the quantity of sub-channels included in the CSI-RS in frequency domain is the same as the quantity of sub-channels included in the resource pool in frequency domain. Therefore, after the first terminal device sends the CSI-RS to the second terminal device, the second terminal device can measure and feed back the CSI of each sub-channel in the resource pool to the first terminal device based on the CSI-RS. Further, the first terminal device can properly select a frequency domain resource based on the CSI of each sub-channel in the resource pool, improving a communication capacity in the SL scenario.

In addition, in a conventional technology, a frequency-domain bandwidth of a CSI-RS is configured by using RRC signaling, requiring relatively large signaling overheads and having a relatively strict limitation on the frequency-domain bandwidth of the CSI-RS and a position of an initial physical resource block (PRB). However, in this embodiment of this application, the RRC signaling does not have any special limitation on information such as the initial PRB. Therefore, a part of signaling overheads can be reduced. Moreover, signaling overheads of the first indication information are also smaller.

In some embodiments, the CSI includes at least one of the following:

a wideband channel quality indication CQI index, where the wideband CQI index is a CQI index corresponding to the frequency-domain bandwidth of the CSI-RS; and CQI values of one or more sub-channels in the resource pool, where a CQI value of one sub-channel in the resource pool corresponds to a CQI index of one sub-channel in the resource pool.

According to the method provided in this embodiment of this application, the frequency-domain bandwidth of the CSI-RS is the same as the frequency-domain bandwidth of the resource pool. Therefore, the CSI obtained by the second terminal device by measuring the CSI-RS includes the wideband CQI index and/or the CQI values of the one or more sub-channels in the resource pool, in other words, the second terminal device measures and feeds back the CSI of each sub-channel in the resource pool to the first terminal device. Further, the first terminal device can select a proper resource based on the CSI of each sub-channel in the resource pool to improve the communication capacity in the SL scenario.

Furthermore, in the conventional technology, the CSI is very likely to include only 1 bit of RI and 4 bits of wideband CQI index (which is used to represent average channel quality of one or more sub-channels), and content of fed back CSI is little. However, in the method provided in this embodiment of this application, the CSI includes the wideband CQI index and/or the CQI values of the one or more sub-channels in the resource pool, and information content carried in the CS is more informative, so that the first terminal device can learn of more information based on the CSI.

In some embodiments, the CSI is carried in a media access control control element MAC CE, and a quantity of bytes occupied by the MAC CE is related to a quantity of sub-channels in the resource pool. That is, the MAC CE provided in this application has a variable size and a more flexible design manner.

In some embodiments, the MAC CE includes 1+⌈y/4⌉ bytes, where

⌈x⌉ is a round up symbol, and y is the quantity of sub-channels in the resource pool.

In some embodiments, a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

where $\beta_{DM-RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

It should be understood that in this implementation of this embodiment of this application, power control factors of the PSSCH on a symbol that is configured to transmit the CSI-RS and a symbol that does not include the CSI-RS (that is, a symbol that is not configured to transmit the CSI-RS) are the same. In addition, power control factors of the CSI-RS on the symbol that includes the CSI-RS and the symbol that does not include the CSI-RS are the same.

On the symbol including the CSI-RS, for an RE not configured to send the CSI-RS, a power of the RE remains unchanged; and for an RE configured to transmit the CSI-RS, a power of the RE is equivalent to extending from W sub-channels to Y sub-channels. As can be learned, the first terminal device reduces a transmit power of a CSI-RS in a single PRB.

In some embodiments, a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}}; \text{ and}$$

$$\beta_{DM-RS,3}^{PSSCH} = \beta_{DM-RS,2}^{PSSCH} * \sqrt{\frac{W*Z}{W*(Z-Q_p) + Y*n_{layer}^{PSSCH}}},$$

where $\beta_{DM-RS,3}^{PSSCH}$ is a power control factor of a physical sidelink shared channel PSSCH on a symbol configured to transmit the CSI-RS, $\beta_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

It should be understood that in this implementation, the PSSCH uses one set of power control factors, namely, $\beta_{DM-RS,2}^{PSSCH}$, on symbols that do not include the CSI-RS; and the PSSCH uses another set of power control factors, namely, $\beta_{DM-RS,3}^{PSSCH}$, on symbols that include the CSI-RS. In some embodiments, a power of the PSSCH on the symbol including the CSI-RS is equivalent to extending from W sub-channels to "PSSCHs of W sub-channels+CSI-RSs of Y sub-channels". That is, on the symbol including the CSI-RS, the first terminal device reduces the transmit power of the PSSCH.

In addition, because $$\beta_{CSI-RS,2} = \beta_{DM-RS,3}^{PSSCH} * \sqrt{\frac{n_{layer}^{PSSCH}}{Q_p}},$$

the power control factor of the CSI-RS is related to $\beta_{DM-RS,3}^{PSSCH}$, that is, related to the power control factor of the PSSCH on the symbol including the CSI-RS. When the power of the PSSCH on the symbol including the CSI-RS is reduced, it means that on the symbol including the CSI-RS, the power control factor of the CSI-RS is also reduced, that is, the first terminal device also reduces the transmit power of the CSI-RS.

Moreover, the foregoing two power control methods can reduce a probability of introducing an AGC symbol.

In some embodiments, this application provides a communication method. The method may be performed by a second terminal device. The method includes: receiving a channel state information-reference signal CSI-RS from a first terminal device, where a frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap in time domain.

In some embodiments, the method further includes:
receiving first indication information from the first terminal device, where the first indication information is used to indicate the second terminal device to send channel state information CSI, and the first indication information is included in 2$^{nd}$ stage sidelink control information SCI.

In some embodiments, the first indication information is further used to indicate that the frequency-domain bandwidth of the CSI-RS is the same as the frequency-domain bandwidth of the resource pool.

In some embodiments, the method further includes:
receiving second indication information from the first terminal device, where the second indication information is used to indicate that the frequency-domain bandwidth of the CSI-RS is the same as the frequency-domain bandwidth of the resource pool.

In some embodiments, the second indication information is included in radio resource control RRC signaling.

In some embodiments, the CSI includes at least one of the following:
a wideband channel quality indication CQI index, where the wideband CQI index is a CQI index corresponding to the frequency-domain bandwidth of the CSI-RS; and
CQI values of one or more sub-channels in the resource pool, where a CQI value of one sub-channel in the resource pool corresponds to a CQI index of one sub-channel in the resource pool.

In some embodiments, the CSI is carried in a media access control control element MAC CE, and a quantity of bytes occupied by the MAC CE is related to a quantity of sub-channels in the resource pool.

In some embodiments, the MAC CE includes $1+\lceil y/4 \rceil$ bytes, where
$\lceil x \rceil$ is a round up symbol, and y is the quantity of sub-channels in the resource pool.

In some embodiments, a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

where
$\beta_{DM-RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}} ; \text{ and}$$

$$\beta_{DM-RS,3}^{PSSCH} = \beta_{DM-RS,2}^{PSSCH} * \sqrt{\frac{W*Z}{W*(Z-Q_p)+Y*n_{layer}^{PSSCH}}},$$

where
$\beta_{DM-RS,3}^{PSSCH}$ is a power control factor of a physical sidelink shared channel PSSCH on a symbol configured to transmit the CSI-RS, $\beta_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, this application provides a communication method. The method may be performed by a first terminal device. The method includes: sending first indication information to a second terminal device. The first indication information is used to indicate a frequency-domain bandwidth of a CSI-RS.

According to the method provided in this embodiment of this application, the first terminal device can flexibly configure the frequency-domain bandwidth of the CSI-RS by using the first indication information. Subsequently, the first terminal device sends a CSI-RS with a configurable frequency-domain bandwidth to the second terminal device. The second terminal device may be triggered to feed back CSI of one or more sub-channels (that is, sub-channels corresponding to a frequency-domain bandwidth of the CSI-RS). In this way, the first terminal device can select a frequency domain resource based on the CSI of the one or more sub-channels in the resource pool, improving a communication capacity in the SL scenario.

In some embodiments, the first indication information is included in PC5 RRC signaling.

In some embodiments, the method further includes: sending the CSI-RS to the second terminal device.

A power control factor $\beta_{CSI-RS,1}$ of the CSI-RS satisfies the following relationship:

$$\beta_{CSI-RS,1} = $$

$$\beta_{DM-RS,3}^{PSSCH} * \sqrt{\frac{W*Z}{(W-U)*Z+U*(Z-Q_p)+y*n_{layer}^{PSSCH}}} * \sqrt{\frac{n_{layer}^{PSSCH}}{Q_p}},$$

where
$\beta_{DM-RS,3}^{PSSCH}$ is a power control factor of a PSSCH on an OFDM symbol configured to transmit an SL CSI-RS; W is a quantity of sub-channels of a PSSCH bandwidth, Z is a quantity of PRBs included in one sub-channel in the resource pool, U is a quantity of sub-channels overlapped in a frequency-domain bandwidth of the PSSCH and a frequency-domain bandwidth of the SL CSI-RS (for example, as shown in FIG. 13, U=1), $Q_p$ is a quantity of ports of the SL CSI-RS, y is a quantity of sub-channels of the frequency-domain bandwidth of the SL CSI-RS, $n_{layer}^{PSSCH}$ is a quantity of scheduled layers of the PSSCH, y is less than or equal to Y, and Y is a quantity of sub-channels in the resource pool.

The power control factor, namely, $\beta_{DM-RS,3}^{PSSCH}$, of the PSSCH on the OFDM symbol configured to transmit the SL CSI-RS satisfies the following relationship:

$$\beta_{DM-RS,3}^{PSSCH} = \beta_{DM-RS,2}^{PSSCH} * \sqrt{\frac{W*Z}{(W-U)*Z + U*(Z-Q_p) + y*n_{layer}^{PSSCH}}},$$

where $\beta_{DM-RS,2}^{PSSCH}$ is the power control factor of the PSSCH on the OFDM symbol not configured to transmit the SL CSI-RS.

In some embodiments, the method further includes: sending second indication information to the second terminal device.

The second indication information is used to trigger the second terminal device to measure a channel and feed back SL CSI based on the SL CSI-RS.

In some embodiments, the second indication information is included in $2^{nd}$ stage SCI.

In some embodiments, this application provides a communication method. The method may be performed by a second terminal device. The method includes: receiving first indication information from a first terminal device, where the first indication information is used to indicate a frequency-domain bandwidth of an SL CSI-RS.

In some embodiments, the first indication information is included in PC5 RRC signaling.

In some embodiments, the method further includes: receiving a CSI-RS from the first terminal device.

A power control factor $\beta_{CSI-RS,1}$ of the CSI-RS satisfies the following relationship:

$$\beta_{CSI-RS,1} = \beta_{DM-RS,3}^{PSSCH} * \sqrt{\frac{W*Z}{(W-U)*Z + U*(Z-Q_p) + y*n_{layer}^{PSSCH}}} * \sqrt{\frac{n_{layer}^{PSSCH}}{Q_p}},$$

where $\beta_{DM-RS,3}^{PSSCH}$ is a power control factor of a PSSCH on an OFDM symbol configured to transmit an SL CSI-RS; W is a quantity of sub-channels of a PSSCH bandwidth, Z is a quantity of PRBs included in one sub-channel in the resource pool, U is a quantity of sub-channels overlapped in a frequency-domain bandwidth of the PSSCH and a frequency-domain bandwidth of the SL CSI-RS (for example, as shown in FIG. 13, U=1), $Q_p$ is a quantity of ports of the SL CSI-RS, y is a quantity of sub-channels of the frequency-domain bandwidth of the SL CSI-RS, $n_{layer}^{PSSCH}$ is a quantity of scheduled layers of the PSSCH, y is less than or equal to Y, and Y is a quantity of sub-channels in the resource pool.

The power control factor, namely, $\beta_{DM-RS,3}^{PSSCH}$, of the PSSCH on the OFDM symbol configured to transmit the SL CSI-RS satisfies the following relationship:

$$\beta_{DM-RS,3}^{PSSCH} = \beta_{DM-RS,2}^{PSSCH} * \sqrt{\frac{W*Z}{(W-U)*Z + U*(Z-Q_p) + y*n_{layer}^{PSSCH}}},$$

where $\beta_{DM-RS,2}^{PSSCH}$ is the power control factor of the PSSCH on the OFDM symbol not configured to transmit the SL CSI-RS.

In some embodiments, the method further includes: receiving second indication information from the first terminal device.

The second indication information is used to trigger the second terminal device to measure a channel and feed back SL CSI based on the SL CSI-RS.

In some embodiments, the second indication information is included in $2^{nd}$ stage SCI.

In some embodiments, this application provides a communication method. The method may be performed by a first terminal device. The method includes: receiving CSI from a second terminal device.

The CSI includes at least one of the following:

a wideband channel quality indication CQI index, where the wideband CQI index is a CQI index corresponding to the frequency-domain bandwidth of the CSI-RS; and CQI values of one or more sub-channels in the resource pool, where a CQI value of one sub-channel in the resource pool corresponds to a CQI index of one sub-channel in the resource pool.

In some embodiments, the method further includes: sending a channel state information-reference signal CSI-RS to the second terminal device, where a frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap bitmap in time domain.

In some embodiments, the method further includes: sending first indication information to the second terminal device, where the first indication information is used to indicate the second terminal device to send channel state information CSI, and the first indication information is included in $2^{nd}$ stage sidelink control information SCI.

In some embodiments, the first indication information is further used to indicate that the frequency-domain bandwidth of the CSI-RS is the same as the frequency-domain bandwidth of the resource pool.

In some embodiments, the method further includes: sending second indication information to the second terminal device, where the second indication information is used to indicate that the frequency-domain bandwidth of the CSI-RS is the same as the frequency-domain bandwidth of the resource pool.

In some embodiments, the second indication information is included in radio resource control RRC signaling.

In some embodiments, the CSI is carried in a media access control control element MAC CE, and a quantity of bytes occupied by the MAC CE is related to a quantity of sub-channels in the resource pool.

In some embodiments, the MAC CE includes $1+\lceil y/4 \rceil$ bytes, where $\lceil x \rceil$ is a round up symbol, and y is the quantity of sub-channels in the resource pool.

In some embodiments, a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

where $\beta_{DM-RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}};$$

and $$\beta_{DM-RS,3}^{PSSCH} = \beta_{DM-RS,2}^{PSSCH} * \sqrt{\frac{W*Z}{W*(Z-Q_p)+Y*n_{layer}^{PSSCH}}},$$

where $\beta_{DM-RS,3}^{PSSCH}$ is a power control factor of a physical sidelink shared channel PSSCH on a symbol configured to transmit the CSI-RS, $\alpha_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, this application provides a communication method. The method may be performed by a second terminal device. The method includes: sending CSI to a first terminal device.

The CSI includes at least one of the following:

a wideband channel quality indication CQI index, where the wideband CQI index is a CQI index corresponding to the frequency-domain bandwidth of the CSI-RS; and CQI values of one or more sub-channels in the resource pool, where a CQI value of one sub-channel in the resource pool corresponds to a CQI index of one sub-channel in the resource pool.

In some embodiments, the method further includes: receiving a channel state information-reference signal CSI-RS from the first terminal device, where a frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap bitmap in time domain.

In some embodiments, the method further includes: receiving first indication information from the first terminal device, where the first indication information is used to indicate the second terminal device to send channel state information CSI, and the first indication information is included in $2^{nd}$ stage sidelink control information SCI.

In some embodiments, the first indication information is further used to indicate that the frequency-domain bandwidth of the CSI-RS is the same as the frequency-domain bandwidth of the resource pool.

In some embodiments, the method further includes: receiving second indication information from the first terminal device, where the second indication information is used to indicate that the frequency-domain bandwidth of the CSI-RS is the same as the frequency-domain bandwidth of the resource pool.

In some embodiments, the second indication information is included in radio resource control RRC signaling.

In some embodiments, the CSI is carried in a media access control control element MAC CE, and a quantity of bytes occupied by the MAC CE is related to a quantity of sub-channels in the resource pool.

In some embodiments, the MAC CE includes 1+⌈y/4⌉ bytes, where

⌈x⌉ is a round up symbol, and y is the quantity of sub-channels in the resource pool.

In some embodiments, a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

where $\beta_{DM-RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}}; \text{ and}$$

$$\beta_{DM-RS,3}^{PSSCH} = \beta_{DM-RS,2}^{PSSCH} * \sqrt{\frac{W*Z}{W*(Z-Q_p)+Y*n_{layer}^{PSSCH}}},$$

where $\beta_{DM-RS,3}^{PSSCH}$ is a power control factor of a physical sidelink shared channel PSSCH on a symbol configured to transmit the CSI-RS, $\beta_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, this application provides a communication apparatus. The apparatus may be the first terminal device in any one of the foregoing embodiments or another apparatus supporting the functions of the first terminal device, for example, may be a component (such as a chip system) in the first terminal device. The apparatus includes:

a communication interface, configured to send a channel state information-reference signal CSI-RS to a second terminal device, where a frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap in time domain.

In some embodiments, the communication interface is further configured to send first indication information to the second terminal device, where the first indication information is used to indicate the second terminal device to send channel state information CSI, and the first indication information is included in $2^{nd}$ stage sidelink control information SCI.

In some embodiments, the first indication information is further used to indicate that the frequency-domain bandwidth of the CSI-RS is the same as the frequency-domain bandwidth of the resource pool.

In some embodiments, the communication interface is further configured to send second indication information, where the second indication information is used to indicate that the frequency-domain bandwidth of the CSI-RS is the same as the frequency-domain bandwidth of the resource pool.

In some embodiments, the second indication information is included in radio resource control RRC signaling.

In some embodiments, the CSI includes at least one of the following:

a wideband channel quality indication CQI index, where the wideband CQI index is a CQI index corresponding to the frequency-domain bandwidth of the CSI-RS; and CQI values of one or more sub-channels in the resource pool, where a CQI value of one sub-channel in the resource pool corresponds to a CQI index of one sub-channel in the resource pool.

In some embodiments, the CSI is carried in a media access control control element MAC CE, and a quantity of bytes occupied by the MAC CE is related to a quantity of sub-channels in the resource pool. That is, the MAC CE provided in this application has a variable size and a more flexible design manner.

In some embodiments, the MAC CE includes $1+\lceil y/4 \rceil$ bytes, where $\lceil x \rceil$ is a round up symbol, and y is the quantity of sub-channels in the resource pool.

In some embodiments, a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

where $\beta_{DM-RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}} ; \text{ and}$$

-continued $$\beta_{DM-RS,3}^{PSSCH} = \beta_{DM-RS,2}^{PSSCH} * \sqrt{\frac{W*Z}{W*(Z-Q_p)+Y*n_{layer}^{PSSCH}}},$$

where $\beta_{DM-RS,3}^{PSSCH}$ is a power control factor of a physical sidelink shared channel PSSCH on a symbol configured to transmit the CSI-RS, $\beta_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, this application provides a communication apparatus. The apparatus may be the second terminal device in any one of the foregoing embodiments or another apparatus supporting the functions of the second terminal device, for example, may be a component (such as a chip system) in the second terminal device. The apparatus includes:

a communication interface, configured to receive a channel state information-reference signal CSI-RS from a first terminal device, where a frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap in time domain.

In some embodiments, the communication interface is further configured to receive first indication information from the first terminal device, where the first indication information is used to indicate the second terminal device to send channel state information CSI, and the first indication information is included in $2^{nd}$ stage sidelink control information SCI.

In some embodiments, the first indication information is further used to indicate that the frequency-domain bandwidth of the CSI-RS is the same as the frequency-domain bandwidth of the resource pool.

In some embodiments, the communication interface is further configured to receive second indication information from the first terminal device, where the second indication information is used to indicate that the frequency-domain bandwidth of the CSI-RS is the same as the frequency-domain bandwidth of the resource pool.

In some embodiments, the second indication information is included in radio resource control RRC signaling.

In some embodiments, the CSI includes at least one of the following:

a wideband channel quality indication CQI index, where the wideband CQI index is a CQI index corresponding to the frequency-domain bandwidth of the CSI-RS; and CQI values of one or more sub-channels in the resource pool, where a CQI value of one sub-channel in the resource pool corresponds to a CQI index of one sub-channel in the resource pool.

In some embodiments, the CSI is carried in a media access control control element MAC CE, and a quantity of bytes occupied by the MAC CE is related to a quantity of sub-channels in the resource pool.

In some embodiments, the MAC CE includes 1+⌈y/4⌉ bytes, where

⌈x⌉ is a round up symbol, and y is the quantity of sub-channels in the resource pool.

In some embodiments, a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

where $\beta_{DM-RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}};$$

$$\beta_{DM-RS,3}^{PSSCH} = \beta_{DM-RS,2}^{PSSCH} * \sqrt{\frac{W*Z}{W*(Z-Q_p) + Y*n_{layer}^{PSSCH}}},$$

where $\beta_{DM-RS,3}^{PSSCH}$ is a power control factor of a physical sidelink shared channel PSSCH on a symbol configured to transmit the CSI-RS, $\beta_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, this application provides a communication apparatus. The apparatus may be the first terminal device in any one of the foregoing embodiments or another apparatus supporting the functions of the first terminal device, for example, may be a component (such as a chip system) in the first terminal device. The apparatus includes:

a communication interface, configured to send first indication information to a second terminal device, where the first indication information is used to indicate a frequency-domain bandwidth of an SL CSI-RS.

In some embodiments, the first indication information is included in PC5 RRC signaling.

In some embodiments, the method further includes: sending the CSI-RS to the second terminal device.

A power control factor $\beta_{CSI-RS,1}$ of the CSI-RS satisfies the following relationship:

$$\beta_{CSI-RS,1} =$$

$$\beta_{DM-RS,3}^{PSSCH} * \sqrt{\frac{W*Z}{(W-U)*Z + U*(Z-Q_p) + y*n_{layer}^{PSSCH}}} * \sqrt{\frac{n_{layer}^{PSSCH}}{Q_p}},$$

where $\beta_{DM-RS,3}^{PSSCH}$ is a power control factor of a PSSCH on an OFDM symbol configured to transmit an SL CSI-RS; W is a quantity of sub-channels of a PSSCH bandwidth, Z is a quantity of PRBs included in one sub-channel in the resource pool, U is a quantity of sub-channels overlapped in a frequency-domain bandwidth of the PSSCH and a frequency-domain bandwidth of the SL CSI-RS (for example, as shown in FIG. 13, U=1), $Q_p$ is a quantity of ports of the SL CSI-RS, y is a quantity of sub-channels of the frequency-domain bandwidth of the SL CSI-RS, $n_{layer}^{PSSCH}$ is a quantity of scheduled layers of the PSSCH, y is less than or equal to Y, and Y is a quantity of sub-channels in the resource pool.

The power control factor, namely, $\beta_{DM-RS,3}^{PSSCH}$, of the PSSCH on the OFDM symbol configured to transmit the SL CSI-RS satisfies the following relationship:

$$\beta_{DM-RS,3}^{PSSCH} = \beta_{DM-RS,2}^{PSSCH} * \sqrt{\frac{W*Z}{(W-U)*Z + U*(Z-Q_p) + y*n_{layer}^{PSSCH}}},$$

where $\beta_{DM-RS,2}^{PSSCH}$ is the power control factor of the PSSCH on the OFDM symbol not configured to transmit the SL CSI-RS.

In some embodiments, the method further includes: sending second indication information to the second terminal device.

The second indication information is used to trigger the second terminal device to measure a channel and feed back SL CSI based on the SL CSI-RS.

In some embodiments, the second indication information is included in $2^{nd}$ stage SCI.

In some embodiments, this application provides a communication apparatus. The apparatus may be the second terminal device in any one of the foregoing embodiments or another apparatus supporting the functions of the second terminal device, for example, may be a component (such as a chip system) in the second terminal device. The apparatus includes:

a communication interface, configured to receive third indication information from a first terminal device, where the third indication information is used to indicate a frequency-domain bandwidth of an SL CSI-RS.

In some embodiments, the first indication information is included in PC5 RRC signaling.

In some embodiments, the method further includes: receiving a CSI-RS from the first terminal device.

A power control factor $\beta_{CSI-RS,1}$ of the CSI-RS satisfies the following relationship:

$$\beta_{CSI-RS,1} =$$

$$\beta_{DM-RS,3}^{PSSCH} * \sqrt{\frac{W*Z}{(W-U)*Z + U*(Z-Q_p) + y*n_{layer}^{PSSCH}}} * \sqrt{\frac{n_{layer}^{PSSCH}}{Q_p}},$$

where $\beta_{DM-RS,3}^{PSSCH}$ is a power control factor of a PSSCH on an OFDM symbol configured to transmit an SL CSI-RS; W is a quantity of sub-channels of a PSSCH bandwidth, Z is a quantity of PRBs included in one sub-channel in the resource pool, U is a quantity of sub-channels overlapped in a frequency-domain bandwidth of the PSSCH and a frequency-domain bandwidth of the SL CSI-RS (for example, as shown in FIG. 13, U=1), $Q_p$ is a quantity of ports of the SL CSI-RS, y is a quantity of sub-channels of the frequency-domain bandwidth of the SL CSI-RS, $n_{layer}^{PSSCH}$ is a quantity of scheduled layers of the PSSCH, y is less than or equal to Y, and Y is a quantity of sub-channels in the resource pool.

The power control factor, namely, $\beta_{DM-RS,3}^{PSSCH}$, of the PSSCH on the OFDM symbol configured to transmit the SL CSI-RS satisfies the following relationship:

$$\beta_{DM-RS,3}^{PSSCH} = \beta_{DM-RS,2}^{PSSCH} * \sqrt{\frac{W*Z}{(W-U)*Z + U*(Z-Q_p) + y*n_{layer}^{PSSCH}}},$$

where $\beta_{DM-RS,2}^{PSSCH}$ is the power control factor of the PSSCH on the OFDM symbol not configured to transmit the SL CSI-RS.

In some embodiments, the method further includes: receiving second indication information from the first terminal device.

The second indication information is used to trigger the second terminal device to measure a channel and feed back SL CSI based on the SL CSI-RS.

In some embodiments, the second indication information is included in $2^{nd}$ stage SCI.

In some embodiments, this application provides a communication apparatus. The apparatus may be the first terminal device in any one of the foregoing embodiments or another apparatus supporting the functions of the first terminal device, for example, may be a component (such as a chip system) in the first terminal device. The apparatus includes:

a communication interface, configured to receive CSI from a second terminal device.

The CSI includes at least one of the following:

a wideband channel quality indication CQI index, where the wideband CQI index is a CQI index corresponding to the frequency-domain bandwidth of the CSI-RS; and CQI values of one or more sub-channels in the resource pool, where a CQI value of one sub-channel in the resource pool corresponds to a CQI index of one sub-channel in the resource pool.

In some embodiments, the method further includes: sending a channel state information-reference signal CSI-RS to the second terminal device, where a frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap bitmap in time domain.

In some embodiments, the method further includes: sending first indication information to the second terminal device, where the first indication information is used to indicate the second terminal device to send channel state information CSI, and the first indication information is included in $2^{nd}$ stage sidelink control information SCI.

In some embodiments, the first indication information is further used to indicate that the frequency-domain bandwidth of the CSI-RS is the same as the frequency-domain bandwidth of the resource pool.

In some embodiments, the method further includes: sending second indication information to the second terminal device, where the second indication information is used to indicate that the frequency-domain bandwidth of the CSI-RS is the same as the frequency-domain bandwidth of the resource pool.

In some embodiments, the second indication information is included in radio resource control RRC signaling.

In some embodiments, the CSI is carried in a media access control control element MAC CE, and a quantity of bytes occupied by the MAC CE is related to a quantity of sub-channels in the resource pool.

In some embodiments, the MAC CE includes $1+\lceil y/4 \rceil$ bytes, where $\lceil x \rceil$ is a round up symbol, and y is the quantity of sub-channels in the resource pool.

In some embodiments, a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

where $\beta_{DM-RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}} \text{; and}$$

$$\beta_{DM-RS,3}^{PSSCH} = \beta_{DM-RS,2}^{PSSCH} * \sqrt{\frac{W*Z}{W*(Z-Q_p) + Y*n_{layer}^{PSSCH}}},$$

where $\beta_{DM-RS,3}^{PSSCH}$ is a power control factor of a physical sidelink shared channel PSSCH on a symbol configured to transmit the CSI-RS, $\beta_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, this application provides a communication apparatus. The apparatus may be the second terminal device in any one of the foregoing embodiments or another apparatus supporting the functions of the second terminal device, for example, may be a component (such as a chip system) in the second terminal device. The apparatus includes: a communication interface, configured to send CSI to a first terminal device.

The CSI includes at least one of the following: a wideband channel quality indication CQI index, where the wideband CQI index is a CQI index corresponding to the frequency-domain bandwidth of the CSI-RS; and CQI values of one or more sub-channels in the resource pool, where a CQI value of one sub-channel in the resource pool corresponds to a CQI index of one sub-channel in the resource pool.

In some embodiments, the method further includes: receiving a channel state information-reference signal CSI- RS from the first terminal device, where a frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap bitmap in time domain.

In some embodiments, the method further includes: receiving first indication information from the first terminal device, where the first indication information is used to indicate the second terminal device to send channel state information CSI, and the first indication information is included in $2^{nd}$ stage sidelink control information SCI.

In some embodiments, the first indication information is further used to indicate that the frequency-domain bandwidth of the CSI-RS is the same as the frequency-domain bandwidth of the resource pool.

In some embodiments, the method further includes: receiving second indication information from the first terminal device, where the second indication information is used to indicate that the frequency-domain bandwidth of the CSI-RS is the same as the frequency-domain bandwidth of the resource pool.

In some embodiments, the second indication information is included in radio resource control RRC signaling.

In some embodiments, the CSI is carried in a media access control control element MAC CE, and a quantity of bytes occupied by the MAC CE is related to a quantity of sub-channels in the resource pool.

In some embodiments, the MAC CE includes $1+\lceil y/4 \rceil$ bytes, where $\lceil x \rceil$ is a round up symbol, and y is the quantity of sub-channels in the resource pool.

In some embodiments, a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

where $\beta_{DM-RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}}; \text{ and}$$

$$\beta_{DM-RS,3}^{PSSCH} = \beta_{DM-RS,2}^{PSSCH} * \sqrt{\frac{W*Z}{W*(Z-Q_p) + Y*n_{layer}^{PSSCH}}},$$

where $\beta_{DM-RS,3}^{PSSCH}$ is a power control factor of a physical sidelink shared channel PSSCH on a symbol configured to transmit the CSI-RS, $\beta_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, this application provides a communication apparatus, configured to implement the functions of the first terminal device in any one of the foregoing embodiments or the functions of the second terminal device in any one of the foregoing embodiments.

In some embodiments, this application provides a communication apparatus. The apparatus has a function of implementing the communication method in any one of the foregoing embodiments. The function may be implemented by hardware, or may be implemented by hardware executing corresponding software. The hardware or the software includes one or more modules corresponding to the function.

In some embodiments, a communication apparatus is provided. The apparatus includes a processor and a memory. The memory is configured to store computer-executable instructions. When the communication apparatus runs, the processor executes the computer-executable instructions stored in the memory, so that the communication apparatus performs the communication method according to any one of the foregoing embodiments.

In some embodiments, a communication apparatus is provided. The apparatus includes a processor. The processor is configured to: after being coupled to a memory and reading instructions in the memory, perform, according to the instructions, the communication method according to any one of the foregoing embodiments.

In some embodiments, this application provides a communication apparatus. The apparatus includes a processor and an interface circuit. The interface circuit is configured to receive code instructions and transmit the code instructions to the processor. The processor is configured to run the code instructions to perform the communication method according to any one of the foregoing embodiments.

In some embodiments, this application provides a communication apparatus. The apparatus may be a chip system. The chip system includes a processor, and in some embodiments, may further include a memory, configured to implement the functions of the method according to any one of the foregoing embodiments. The chip system may include a chip, or include a chip and another discrete device.

In some embodiments, a communication apparatus is provided. The apparatus may be a circuit system. The circuit system includes a processing circuit. The processing circuit is configured to perform the communication method according to any one of the foregoing embodiments.

In some embodiments, this application further provides a computer-readable storage medium, including instructions. When the instructions are run on a computer, the computer is enabled to perform the method according to any one of the foregoing embodiments.

In some embodiments, this application further provides a computer program product, including instructions. When the instructions are run on a computer, the computer is enabled to perform the method according to any one of the foregoing embodiments.

In some embodiments, this application provides a system. The system includes the first terminal device and the second terminal device according to any one of the foregoing embodiments.

BRIEF DESCRIPTION OF DRAWINGS

FIG. 7 is a schematic diagram of a MAC CE according to some embodiments of the present disclosure;

FIG. 8 is a schematic diagram of another MAC CE according to some embodiments of the present disclosure;

FIG. 9 is a schematic diagram of another MAC CE according to some embodiments of the present disclosure;

DESCRIPTION OF EMBODIMENTS

In the specification and accompanying drawings of this application, the terms "first", "second", and the like are intended to distinguish between different objects or distinguish between different processing of a same object, but do not indicate a particular order of the objects.

"At least one" means one or more.

"A plurality of" means two or more than two.

And/or describes an association relationship between associated objects, and represents that three relationships may exist. For example, A and/or B may represent the following cases: Only A exists, both A and B exist, and only B exists, where A and B may be singular or plural.

The character "/" generally indicates an "or" relationship between associated objects. For example, A/B may represent A or B.

In addition, the terms "including", "having", or any other variant thereof in descriptions of this application are intended to cover a non-exclusive inclusion. For example, a process, a method, a system, a product, or a device that includes a series of operations or units is not limited to the listed operations or units, but in some embodiments further includes other unlisted operations or units, or in some embodiments further includes other inherent operations or units of the process, the method, the product, or the device.

It should be noted that, in embodiments of this application, the term such as "example" or "for example" is used to represent giving an example, an illustration, or descriptions. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the specification and accompanying drawings of this application, "of", "relevant", and "corresponding" sometimes may be exchanged. It should be noted that their means are the same when no difference is emphasized.

First, some technical terms used in the embodiments of this application are described:

1. Channel Measurement

To obtain a channel state and the like, a channel measurement procedure is introduced to a communication system. In an NR system, channel measurement of an uplink (UL) is implemented by using a sounding reference signal (SRS) framework. As shown in FIG. TA, channel measurement of a downlink (DL) is implemented by using a flexible CSI-RS framework. Channel measurement of an SL is implemented by using the CSI-RS framework.

Figure 1A:
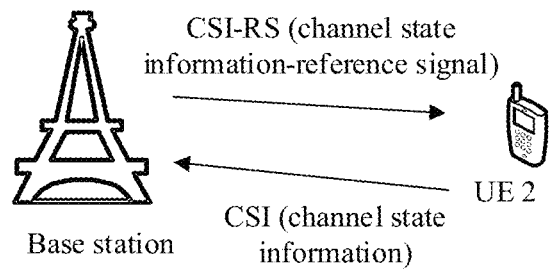
FIG. 1A is a schematic diagram of an architecture of channel measurement according to some embodiments of the present disclosure.
Figure 1B:
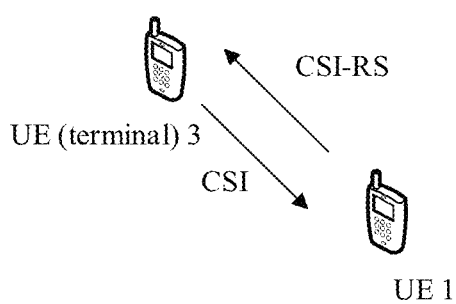
FIG. 1B is a schematic diagram of an architecture of channel measurement according to some embodiments of the present disclosure.

The embodiments of this application mainly describe the channel measurement procedure of the SL. As shown in FIG. 1B, an example in which a transmit end (that is, the side sending a CSI-RS) is UE 1 and a receive end (that is, a side receiving the CSI-RS) is UE 3 is used. On the SL, the CSI-RS framework is mainly implemented as: The UE 1 sends the CSI-RS to the UE 3, the UE 3 measures a channel and calculates CSI based on the CSI-RS, and feeds back the CSI to the UE 1.

At the transmit end, namely, the UE 1, the CSI is used to calculate a proper transmit parameter to optimize use efficiency of a wireless channel. At the receive end, namely, the UE 3, the CSI is used to receive a signal correctly.

2. CSI Procedure of a Uu Interface

The Uu interface is an interface between a network device and a terminal device. For example, in FIG. TA, an interface between a base station and UE 2 is the Uu interface.

The CSI procedure of the Uu interface includes a configuration stage and a channel measurement stage. At the configuration stage, the base station configures a CSI-RS resource for UE. At the channel measurement stage, the base station sends a CSI-RS to the UE, and the UE feeds back CSI to the base station based on the CSI-RS.

At the configuration stage, the base station (such as a gNB) configures one or more CSI-RS patterns for the UE by using radio resource control (RRC) signaling, and a configuration parameter of each CSI-RS pattern includes a resource ID, a resource mapping parameter, and the like. The resource mapping parameter further includes a quantity of ports of a CSI-RS, a frequency domain position, a time domain position, a frequency-domain bandwidth, and the like. The gNB sends the CSI-RS to the UE, the UE measures and calculates the CSI-RS, and feeds back the CSI to the gNB.

In the configuration parameter of the foregoing CSI-RS resource, the frequency-domain bandwidth of the CSI-RS is configured by a CSI-FrequencyOccupation information element (IE) in the RRC signaling. For example, configuration information included in the CSI-FrequencyOccupation IE is as follows:

```
CSI-FrequencyOccupation::=SEQUENCE {
    startingRB    INTEGER (0..maxNrofPhysicalResourceBlocks−1),
    nrofRBs       INTEGER (24..maxNrofPhysicalResourceBlocksPlus1),
    ...
}
```

A meaning of each field in the CSI-FrequencyOccupation IE is as follows: startingRB represents a position of an initial physical resource block (PRB) of the CSI-RS resource relative to a common resource block #0 (CRB #0) in frequency domain within a resource block (RB) grid. A value range of startingRB is greater than or equal to 0 and less than or equal to maxNrofPhysicalResourceBlocks−1, and startingRB is an integer multiple of 4. A value of maxNrofPhysicalResourceBlocks is defined as 275 in a standard. Therefore, the value range of startingRB is {0, 4, 8, . . . }.

It should be noted that the PRB and the RB may be considered as having a same meaning, both represent 12 consecutive sub-carriers in frequency domain. The CRB #0 represents a common reference point of the RB grid. A frequency domain position of any PRB may be determined by using an offset of the PRB relative to the CRB #0.

nrofRBs represents a quantity of PRBs spanned (span) in the CSI-RS resource. A value of nrofRBs needs to be an integer multiple of 4. A minimum configurable nrofRBs value is a smallest value between 24 and a bandwidth of a bandwidth part (BWP) associated with the CSI-RS. A maximum configurable nrofRBs value is maxNrofPhysicalResourceBlocksPlus1, where the value of maxNrofPhysicalResourceBlocksPlus1 is defined as 276 in the standard. When a configured nrofRBs value is greater than the bandwidth of the BWP associated with the CSI-RS, the UE assumes that an actual bandwidth of the CSI-RS resource is the same as the bandwidth of the BWP.

It should be noted that the BWP represents a subset on a carrier bandwidth or a system bandwidth. The bandwidth of the BWP may be represented by the quantity of PRBs.

Based on the foregoing RRC signaling, the gNB configures a frequency-domain bandwidth of a CSI-RS resource for the UE.

At the channel measurement stage, when the UE feeds back the CSI to the gNB, if the gNB configures a channel quality indicator (CQI) corresponding to a UE feedback sub-band), the UE feeds back, at a granularity of a sub-band, a sub-band differential CQI value corresponding to each of a plurality of sub-bands. In some embodiments, when the UE feeds back the sub-band differential CQI to the gNB, the UE further needs to feed back a wideband CQI index.

A differential CQI value corresponding to a sub-band is determined by a sub-band the CQI index and a wideband CQI index. The differential CQI value is 2 bits. The CQI index (including a wideband CQI index and a sub-band CQI index) is 4 bits, and the CQI index is an integer from 0 to 15. A larger CQI index value indicates better channel quality, and a smaller CQI index value indicates poorer channel quality. A size of a single sub-band is configured by RRC signaling, a value of a single sub-band is one value in {4, 8, 16, 32}, and a unit is PRB.

Determining the differential CQI value based on the sub-band CQI index and the wideband CQI index includes the following operation: for a sub-band with an index s, determining a sub-band offset level based on a sub-band CQI index and a wideband CQI index of the sub-band with the index s according to the following formula:

sub-band offset level (s)=sub-band CQI index (s)−wideband CQI index, where s represents an index of a sub-band. Therefore, sub-band offset level (s) represents a sub-band offset level of a sub-band with an index s, and sub-band CQI index (s) represents a sub-band CQI index of the sub-band with the index s. For any sub-band, a differential CQI value of the sub-band is determined based on a sub-band offset level of the sub-band and Table 1.

TABLE 1

| Differential CQI value | Sub-band offset level |
|---|---|
| 0 | 0 |
| 1 | 1 |
| 2 | ≥2 |
| 3 | ≤−1 |

For example, when the UE calculates the CSI based on the CSI-RS from gNB, it is obtained that the wideband CQI index is 13, a sub-band CQI index of a sub-band 0 is 11. In this case, a corresponding sub-band offset level is 11−13=−2. Next, it is determined, based on Table 1, that when the sub-band offset level is less than or equal to 1, the differential CQI value is 3. Therefore, the two-bit differential CQI value corresponding to the sub-band 0 may be represented as 11.

In the CSI procedure, at a granularity of a sub-band, the size of a single sub-band is one of {4, 8, 16, 32}, and as described above, the frequency-domain bandwidth of the CSI-RS needs to be a multiple of 4. A concept of sub-channel is introduced in NR. As can be learned from the 3GPP R16 protocol, a quantity of PRBs corresponding to a single sub-channel is in some embodiments 10, 15, 20, 25, 50, 75, 100, or the like. It cannot be ensured that a value obtained by multiplying this number by the quantity of sub-channels corresponding to the PSSCH is a multiple of 4. Therefore, a manner for configuring a frequency-domain bandwidth of a CSI-RS in an existing Uu interface is not applicable to the NR. In addition, because the concept of sub-band is not introduced to the NR, the differential CQI value is not applicable to the NR either.

3. CSI Procedure of a PC5 Interface

At the configuration stage, a transmit end UE configures a CSI-RS pattern for a receive end UE by using PC5 RRC signaling. Configuration parameters of the CSI-RS pattern include a quantity of ports of a CSI-RS, a frequency domain position, and a time domain position.

Different from the foregoing CSI procedure of the Uu interface, in the current CSI procedure of the PC5 interface, a base station does not configure the frequency-domain bandwidth of the CSI-RS pattern, because the 3GPP R16 protocol stipulates that there is an SL CSI-RS on each PRB corresponding to the physical sidelink shared channel (PSSCH). This means that the frequency-domain bandwidth of the SL CSI-RS is the same as the frequency-domain bandwidth of the associated PSSCH.

The PSSCH associated with the SL CSI-RS may be understood as a PSSCH for transmitting the SL CSI-RS.

It should be noted that the PSSCH is a channel configured to transmit SL data. The frequency-domain bandwidth of the PSSCH may be represented by a quantity of PRBs. In some embodiments, the frequency-domain bandwidth of the PSSCH includes one or more sub-channels in a resource pool, and one sub-channel includes a plurality of consecutive PRBs. The quantity of sub-channels corresponding to the PSSCH is multiplied by a quantity of PRBs corresponding to one sub-channel to obtain a quantity of PRBs included in the PSSCH. The resource pool is a set of time-frequency resources that can be used for SL transmission, and specific forms are a plurality of orthogonal frequency division multiplexing (OFDM) symbols in time domain and a set corresponding to a plurality of consecutive PRBs in frequency domain.

Figure 2:
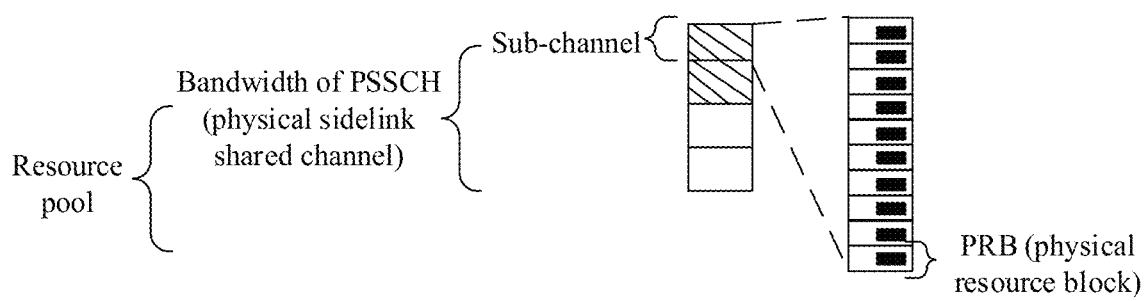
FIG. 2 is a schematic diagram of a bandwidth according to some embodiments of the present disclosure.
Figure 2:
Figure 2:

For example, in FIG. 2, the resource pool includes 4 sub-channels, each sub-channel includes 10 PRBs, and a PSSCH includes 2 sub-channels, that is, 20 PRBs. Therefore, the frequency-domain bandwidth of the PSSCH is 20 PRBs. Because the protocol stipulates that the frequency-domain bandwidth of the SL CSI-RS is the same as the frequency-domain bandwidth of the associated PSSCH, the frequency-domain bandwidth of the SL CSI-RS is also 20 PRBs. FIG. 2 shows time-frequency resources occupied by SL CSI-RSs on one sub-channel of a PSSCH. It can be learned that 10 PRBs corresponding to the sub-channel each have an SL CSI-RS. In each PRB, each SL CSI-RS has a same quantity of ports, a same time domain position, and a same frequency domain position.

At the channel measurement stage, a transmit end UE sends sidelink control information (SCI) to a receive end UE. The SCI includes 1st stage SCI and 2nd stage SCI. The 1st stage SCI is carried on a physical sidelink control channel (PSCCH). The 2nd stage SCI is carried on a PSSCH. 1 bit in the 2nd stage SCI is used to trigger the receive end UE to feed back CSI. The transmit end UE sends an SL CSI-RS to the receive end UE. The receive end UE measures and calculates the CSI based on the SL CSI-RS, and feeds back the CSI to the transmit end UE by using a media access control control element (MAC CE).

Different from the CSI procedure of the Uu interface, in the current CSI procedure of the PC5 interface, when the receive end UE feeds back the CSI to the transmit end UE, the 3GPP R16 protocol stipulates that a differential CQI value is not fed back. Therefore, the receive end UE feeds back 1 bit of rank indicator (Rank Indicator, RI) and 4 bits of wideband CQI index (where the differential CQI value is not fed back) to the transmit end UE by using a media access control control element (MAC CE).

In the existing CSI procedure of the PC5 interface, a frequency-domain bandwidth of the SL CSI-RS is the same as a frequency-domain bandwidth of an associated PSSCH. Therefore, the receive end can measure only CSI of one or more sub-channels corresponding to the associated PSSCH. For example, as shown in FIG. 2, SL CSI-RSs only exist on PRBs of shaded sub-channels. Therefore, the receive end can measure and calculate only the CSI on this part of sub-channels. This has the following disadvantages:

(1) When the transmit end UE selects another sub-channel (a sub-channel that is not shaded) to send the PSSCH, because the receive end UE has not measured and fed back CSI of the another sub-channel, the transmit end cannot learn of specific information about the another sub-channel. Further, the transmit end UE may not be capable of properly adjusting a modulation and coding scheme (MCS) used to send the PSSCH.

(2) The transmit end UE determines, based on the CSI fed back by the receive end UE, that channel quality of one or more sub-channels (such as two shaded sub-channels shown in FIG. 2) currently used for PSSCH transmission is poor. However, because CSI of another sub-channel (such as a sub-channel that is not shaded in FIG. 2) is unknown, the transmit end UE cannot determine whether the another sub-channel in the resource pool can implement reliable PSSCH transmission. Further, the PSSCH transmission reliability may not be improved by switching the sub-channel.

It can be concluded from the above that in the current CSI solution of the PC5 interface, the transmit end UE still may not allocate a resource properly based on the CSI fed back by the receive end UE. Further, it is not conducive to effective frequency hopping communication in an SL.

In addition, in the current CSI solution of the PC5 interface, the CSI carries 1 bit of RI and 4 bits of wideband CQI index, the fed back CSI content is little, and it is not conducive to effective frequency hopping communication in an SL either.

As can be learned, the current CSI solutions of the Uu interface and the PC5 interface are not applicable to NR.

To resolve the foregoing technical problem, an embodiment of this application provides a communication method. The communication method may be applied to an SL scenario, including a direct communication scenario between various terminal devices, for example, including but not limited to, V2X, device to device (D2D) communication, and vehicle to vehicle (vehicle to vehicle, V2V) communication.

Figure 3:
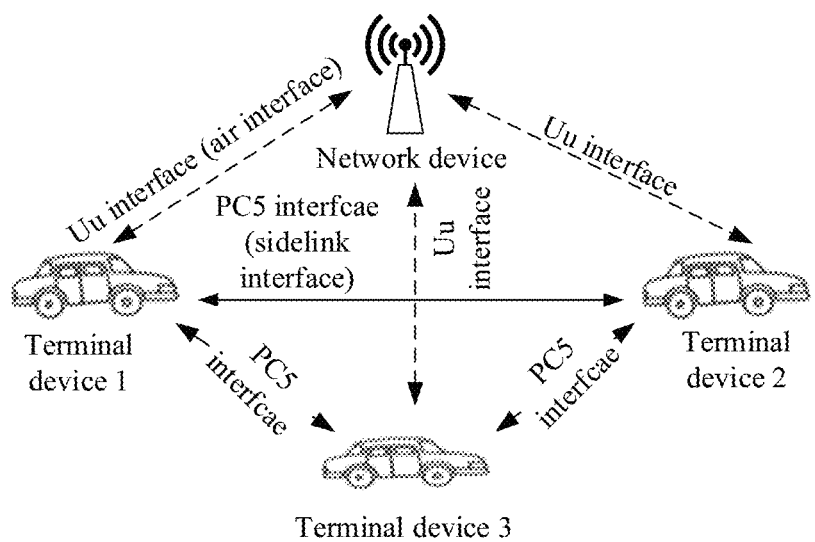
FIG. 3 is a schematic diagram of an architecture of a communication system according to some embodiments of the present disclosure.

FIG. 3 shows a V2X communication system according to an embodiment of this application. As shown in FIG. 3, the V2X communication system may include a plurality of terminal devices (such as a terminal device 1, a terminal device 2, and a terminal device 3 shown in FIG. 3). A direct communication link may be established between a terminal device and another terminal device around to implement direct communication. For example, the terminal device 1 can directly communicate with the terminal device 2. For example, a direct communication link established between one terminal device and another terminal device may be defined as an SL, and a direct communication interface between the terminal device and the another terminal device around may be referred to as a PC5 interface. The V2X communication system shown in FIG. 3 may further include a network device. A terminal device may send a V2X message to a peer terminal device through relay of a network device, or may access a network through a network device. For example, a terminal device 1 may send a V2X message to the network device, and the network device sends the V2X message to a terminal device 2. For example, an interface between the terminal device and the network device may be referred to as a Uu interface. In some embodiments, the network architecture shown in FIG. 3 is merely an example. A quantity of network elements included in the V2X communication system shown in FIG. 3 is not limited in this embodiment of this application. In addition, although it is not shown in the figure, in addition to the network functional entities shown in FIG. 3, the communication system shown in FIG. 3 may further include another functional entity, for example, an application server (application server) or a core network device. This is not limited herein.

The network device in FIG. 3 is mainly configured to implement functions such as wireless physical control, resource scheduling, wireless resource management, wireless access control, and mobility management. The network device may be an access network (access network, AN) device/a radio access network (RAN) device, a device including a plurality of 5G-AN/5G-RAN nodes, or any node among a NodeB (NB), an evolved NodeB (evolution nodeB, eNB), a next generation NodeB (generation nodeB, gNB), a transmission and reception point (TRP), a transmission point (TP), and another access point. In this embodiment of this application, an apparatus configured to implement a function of the network device may be the network device, or may be an apparatus that can support the network device in implementing this function, for example, a chip system. In the technical solution provided in this embodiment of this application, an example in which the apparatus configured to implement the function of the network device is a network device is used to describe the technical solution provided in this embodiment of this application.

The foregoing terminal device is a terminal that accesses the V2X communication system and that has a wireless transceiver function, or a chip that can be disposed in the terminal. For example, the terminal device may be a vehicle shown in FIG. 3. The vehicle is not limited to any type of vehicle such as an automobile, a bicycle, an electric vehicle, an airplane, a ship, a train, a high-speed rail, or the like. The vehicle may include a vehicle-mounted device that can directly communicate another device. The vehicle-mounted device may be referred to as user equipment (UE) or a terminal device.

The terminal device may be referred to user equipment, an access terminal, a subscriber unit, a subscriber station, a mobile station, a remote station, a remote terminal, a mobile device, a user terminal, a terminal, a wireless communication device, a user agent, a user apparatus, or the like. For example, the terminal device in the embodiments of this application may be a mobile phone, a pad, a computer having a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, a vehicle-mounted terminal, an RSU having a terminal function, or the like. The terminal device in this application may alternatively be one or more components or units embedded into a vehicle-mounted module, a vehicle-mounted component, a vehicle-mounted chip, or a vehicle-mounted unit of a vehicle, and can be implement the communication method provided in this application.

In this embodiment of this application, an apparatus configured to implement a function of the terminal device may be the terminal device, or may be an apparatus that can support the terminal device in implementing this function, for example, a chip system. In this embodiment of this application, the chip system may include a chip, or may include a chip and another discrete component.

Network architectures and service scenarios described in this application are intended to describe the technical solutions in this application more clearly, and do not constitute a limitation on the technical solutions provided in this application. Persons of ordinary skill in the art may know that: With the evolution of network architectures and the emergence of new service scenarios, the technical solutions provided in this application are also applicable to similar technical problems.

Figure 4:
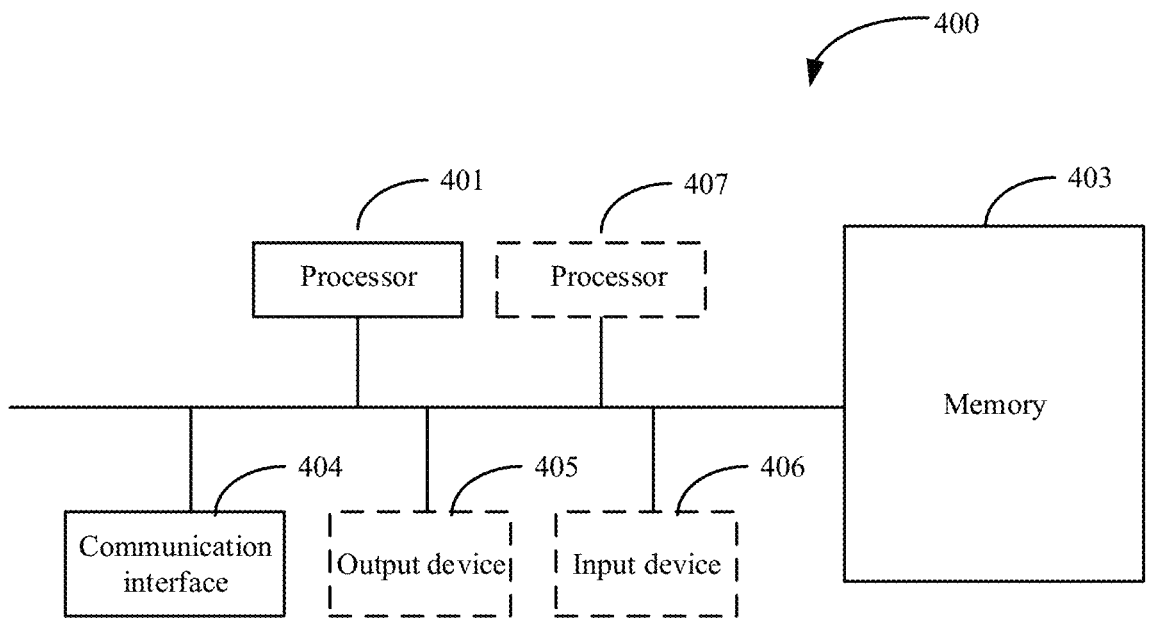
FIG. 4 is a schematic diagram of a structure of a communication apparatus according to some embodiments of the present disclosure.

In some embodiments, the terminal device in this embodiment of this application may be implemented by a communication apparatus having the structure described in FIG. 4. FIG. 4 is a schematic diagram of a structure of a communication apparatus according to an embodiment of this application. The communication apparatus 400 includes at least one processor 401, a memory 403, and at least one communication interface 404. The memory 403 may further be included in the processor 401.

The processor 401 may include one or more processing units. The processing unit may be a central processing unit (CPU), an application-specific integrated circuit (ASIC), or one or more integrated circuits configured to control execution of a program in this application.

A communication line exists between the foregoing components, and is configured to transmit information between the components.

The communication interface 404 is configured to communicate with another device. In this embodiment of this application, the communication interface may be a module, a circuit, an interface, or another apparatus that can implement the communication function, and is configured to communicate with another device. In some embodiments, the communication interface may be an independent transmitter, which may be configured to send information to another device. The communication interface may alternatively be an independent receiver, which is configured to receive information from another device. The communication interface may alternatively be a component integrated with information transmission and reception functions, namely, a transceiver.

The memory 403 may be a read-only memory (ROM), another type of storage module capable of storing static information and instructions, a random access memory (RAM), another type of storage module capable of storing dynamic information and instructions, an electrically erasable programmable read-only memory (EEPROM), a compact disc, a magnetic disk, or another magnetic storage device. The memory may exist independently, and is connected to the processor through the communication line. Alternatively, the memory may be integrated with the processor.

The memory 403 is configured to store computer-executable instructions. The computer-executable instructions may be invoked by one or more processing units in the processor 401 to perform corresponding operations in methods provided in the following embodiments.

In some embodiments, the computer-executable instructions in this embodiment of this application may be referred to as application code, instructions, computer programs, or the like. This is not specifically limited in this embodiment of this application.

In some embodiments, the communication apparatus 400 may include a plurality of processors, for example, the processor 401 and a processor 407 shown in FIG. 4. Each of these processors may be a single-core processor or a multi-core processor. Herein, the processor may be one or more devices, circuits, and/or processing cores configured to process data (for example, computer program instructions).

In some embodiments, the communication apparatus 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive a user input in a plurality of manners. For example, the input device 406 may be a mouse, a keyboard, a touchscreen device, or a sensor device.

FIG. 4 is an example of a structure of a diagram of the communication apparatus. It should be understood that the communication apparatus shown in the figure is merely an example. In addition, during actual application, the communication apparatus may have more or fewer components than those shown in FIG. 4, two or more components may be combined, or a different component configuration may be used.

The communication apparatus 400 may be a general device or a dedicated device. A type of the communication apparatus 400 is not limited in this embodiment of this application. The terminal device may be a device having a structure similar to that shown in FIG. 4.

The communication methods provided in the embodiments of this application are described below with reference to the accompanying drawings.

Figure 5:
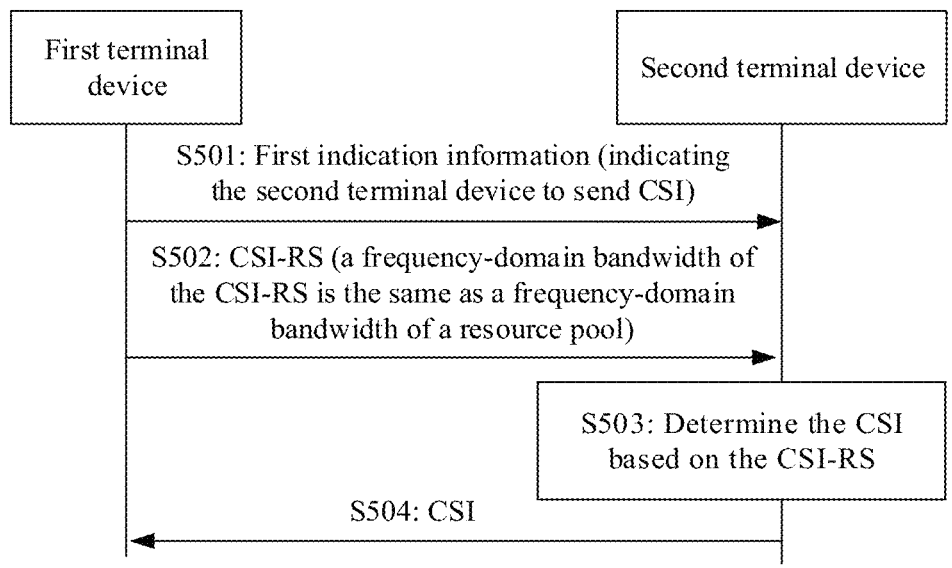
FIG. 5 is a schematic flowchart of a communication method according to some embodiments of the present disclosure.

It should be noted that the embodiments of this application are mainly applied to an SL scenario, that is, a procedure in which terminal devices communicate with each other through a PC5 interface. As shown in FIG. 5, a communication method provided in an embodiment of this application includes the following operations:

S501: A first terminal device sends first indication information to a second terminal device.

Correspondingly, the second terminal device receives the first indication information from the first terminal device.

The first indication information is used to indicate the second terminal device to send SL CSI. The first indication information may also be referred to as trigger information. In a possible implementation, the first indication information is included in 2nd stage SCI. For example, the first indication information may be 1 bit in the 2nd stage SCI.

In this embodiment of this application, the first terminal device is the terminal device sending an SL CSI-RS; and the second terminal device is the terminal device receiving the SL CSI-RS, measuring SL CSI based on the SL CSI-RS, and feeds back the SL CSI to the first terminal device. It should be understood that in different scenarios, roles of the first terminal device and the second terminal device may be exchanged.

S502: The first terminal device sends an SL CSI-RS to the second terminal device.

Correspondingly, the second terminal device receives the SL CSI-RS from the first terminal device.

A frequency-domain bandwidth of the SL CSI-RS is the same as a frequency-domain bandwidth of a resource pool.

In a possible implementation, the resource pool is a time-frequency resource set included in an SL BWP, the resource pool includes one or more consecutive sub-channels in frequency domain, one sub-channel in the resource pool includes one or more consecutive PRBs, and the resource pool is determined based on a periodic bitmap in time domain.

In some embodiments, the BWP represents a subset on a carrier bandwidth or a system bandwidth.

In some embodiments, a quantity of sub-channels included in the resource pool, a quantity of PRBs included by one sub-channel in the resource pool, and the bitmap are determined based on higher layer signaling. The higher layer signaling is RRC signaling from a network device or pre-configuration pre-configuration information of the first terminal device.

In some embodiments, the resource pool may be used for transmission of a PSSCH or reception of a PSSCH. The resource pool may be associated with one of an SL resource allocation mode 1 or an SL resource allocation mode 2.

The resource allocation mode 1 and the resource allocation mode 2 may have other names. This is not limited in embodiments of this application.

Figure 6A:
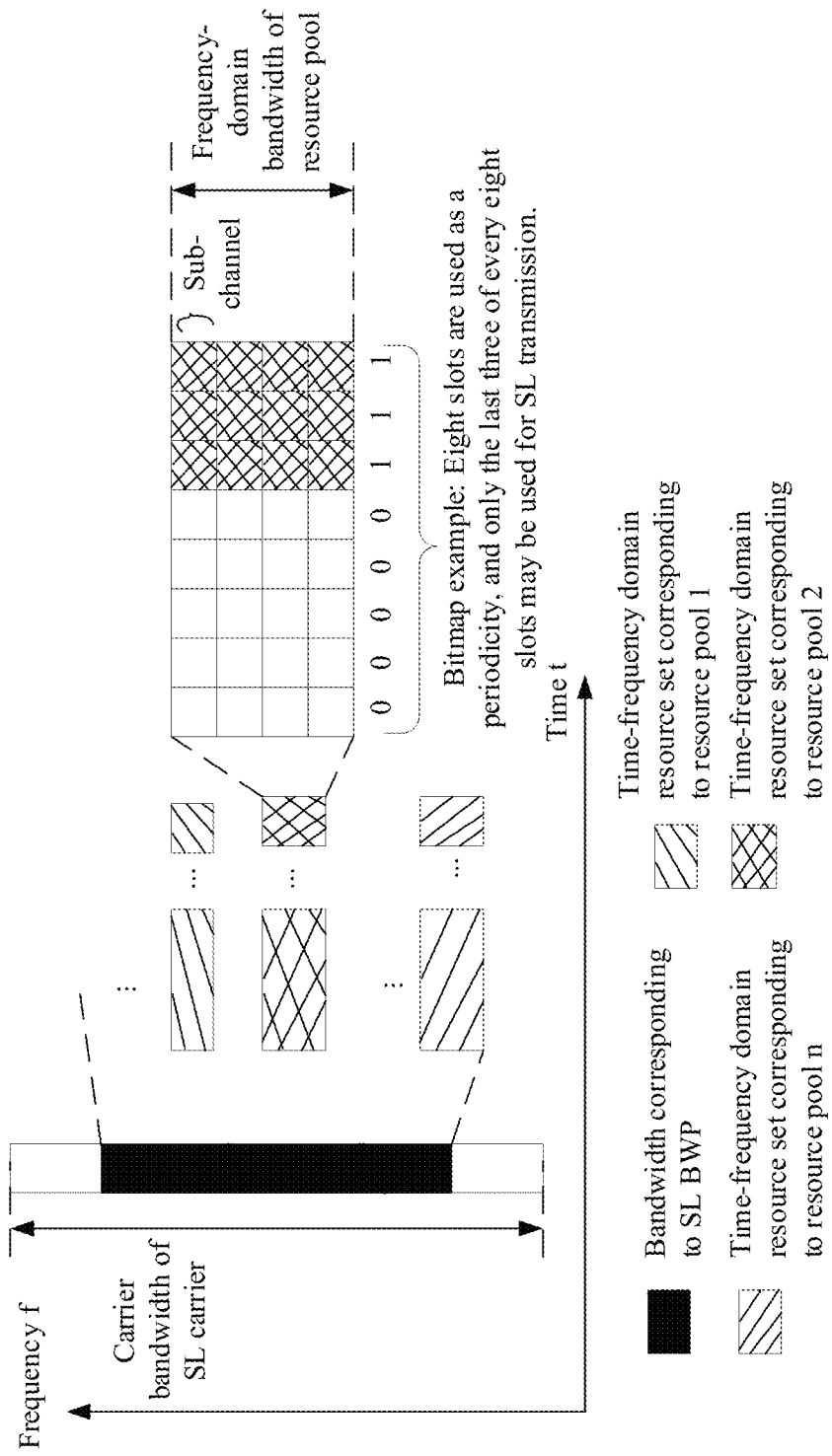
FIG. 6A is a schematic diagram of a resource pool according to an embodiment of this application.

For example, as shown in FIG. 6A, a BWP is a subset of carrier bandwidths of an SL carrier. Time-frequency resources in the BWP include time-frequency resource sets respectively corresponding to a resource pool 1, a resource pool 2, . . . , and a resource pool n. FIG. 6A shows frequency domain resources included in the resource pool 2, four sub-channels included in frequency domain, and some time domain resources included in the resource pool 2. Each sub-channel includes one or more PRBs. The time domain resource includes but is not limited to a slot and a symbol. The time domain resources included in the resource pool 2 are determined based on a bitmap. The bitmap is 00000111, indicating that eight slots are used as a periodicity. Only the last three of every eight slots may be used for SL transmission.

It should be noted that for ease of description, the SL CSI-RS in the embodiments of this application may be briefly referred to as a CSI-RS. Similarly, the SL CSI may also be briefly referred to as CSI. This is described uniformly herein.

It should be understood that a transmit end UE sends an SL CSI-RS to a receive end UE in a resource pool. Therefore, it may be considered that the resource pool is associated with the SL CSI-RS. A frequency-domain bandwidth of the CSI-RS is the same as a frequency-domain bandwidth of the resource pool. For example, if the frequency-domain bandwidth of the resource pool is X PRBs, the frequency-domain bandwidth of the SL CSI-RS send in the resource pool is also X PRBs, where X is a positive integer. Further, if the resource pool includes Y sub-channels, and one of the Y sub-channels includes Z PRBs, X=Y*Z, where Y and Z are positive integers.

It should be understood that the frequency-domain bandwidth of the CSI-RS represents the frequency-domain bandwidth corresponding to all sub-channels on which an SL CSI-RS exists or the frequency-domain bandwidth corresponding to all PRBs on which an SL CSI-RS exists.

Figure 6B:
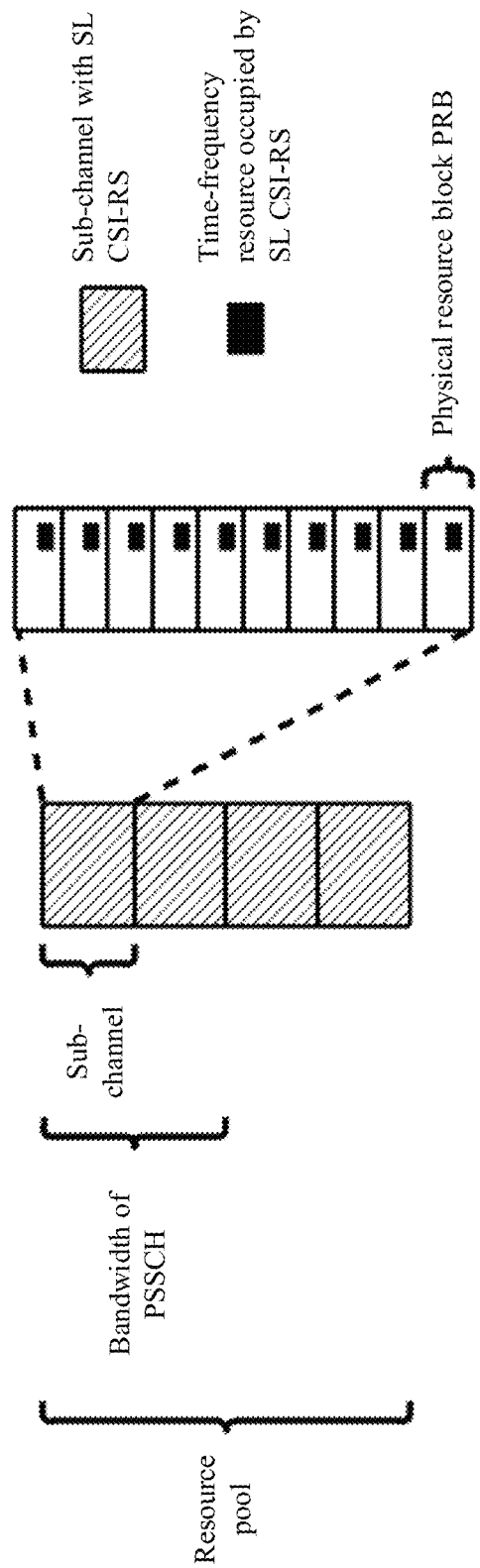
FIG. 6B is a schematic diagram of another bandwidth according to some embodiments of the present disclosure.

For example, the first terminal device sends the CSI-RS in a resource pool shown in FIG. 6B. The resource pool includes four sub-channels (the four shaded sub-channels), and each sub-channel includes 10 PRBs. A frequency-domain bandwidth of the resource pool is 4*10=40 PRBs. In the resource pool, a frequency-domain bandwidth of a PSSCH is 2 sub-channels, that is, 20 PRBs. A frequency-domain bandwidth of an SL CSI-RS is the same as a frequency-domain bandwidth of an associated resource pool (that is, the resource pool used to send the SL CSI-RS), 40 PRBs. FIG. 6B shows time-frequency resources occupied by the SL CSI-RS on one of the sub-channels. It can be learned that 10 PRBs corresponding to the sub-channel each have an SL CSI-RS. In each PRB, each SL CSI-RS has a same quantity of ports, a same time domain position, and a same frequency domain position.

In some embodiments, in this embodiment of this application, to avoid introducing an extra automatic gain control (AGC) symbol, it needs to be ensured that the receive end, namely, the second terminal device, has a same receive power on each orthogonal frequency division multiplexing (OFDM) symbol. Therefore, a transmit power of the transmit end, namely, the first terminal device, needs to be adjusted when the transmit end sends an SL CSI-RS.

The receive end can perform AGC processing to avoid processing performance deterioration of the receive end caused by problems such as signal saturation. During AGC processing, an AGC symbol is an OFDM symbol used for AGC. In a possible implementation, the transmit end sends a short training sequence to the receive end on some OFDM symbols; and the receive end receives the short training sequence from corresponding symbols and performs AGC processing. The symbol on which the receive end receives the short training sequence may be considered as an AGC symbol. Certainly, there may further be another implementation.

In a possible implementation, a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

where $\beta_{DM-RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In an existing CSI solution of a PC5 interface, a power control factor of an SL CSI-RS that has a same frequency-domain bandwidth as that of a PSSCH is:

$$\beta_{CSI-RS,1} = \beta_{DM-RS,1}^{PSSCH} * \sqrt{\frac{n_{layer}^{PSSCH}}{Q_p}}.$$

It can be learned that $$\beta_{CSI-RS} = \beta_{DM-RS,1} * \sqrt{\frac{W}{Y}}.$$

It should be understood that in this implementation of this embodiment of this application, power control factors of the PSSCH on a symbol that includes the CSI-RS (that is, a symbol configured to send the CSI-RS) and a symbol that does not include the CSI-RS (that is, a symbol that is not configured to transmit the CSI-RS) are the same. In addition, power control factors of the CSI-RS on the symbol that includes the CSI-RS and the symbol that does not include the CSI-RS are the same.

On the symbol including the CSI-RS, for an RE not configured to send the CSI-RS, a power of the RE remains unchanged; and for an RE configured to transmit the CSI-RS, a power of the RE is equivalent to extending from W sub-channels to Y sub-channels. As can be learned, the first terminal device reduces a transmit power of a CSI-RS in a single PRB.

In another possible implementation, a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}}; \text{ and}$$

$$\beta_{DM-RS,3}^{PSSCH} = \beta_{DM-RS,2}^{PSSCH} * \sqrt{\frac{W * Z}{W * (Z - Q_p) + Y * n_{layer}^{PSSCH}}},$$

where $\beta_{DM-RS,3}^{PSSCH}$ is a power control factor of a physical sidelink shared channel PSSCH on a symbol configured to transmit the CSI-RS, $\beta_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

It should be understood that in this implementation, the PSSCH uses one set of power control factors, namely, $\beta_{DM-RS,2}^{PSSCH}$, on symbols that do not include the CSI-RS; and the PSSCH uses another set of power control factors, namely, $\beta_{DM-RS,3}^{PSSCH}$, on symbols that include the CSI-RS. In some embodiments, a power of the PSSCH on the symbol including the CSI-RS is equivalent to extending from W sub-channels to "PSSCHs of W sub-channels+CSI-RSs of Y sub-channels". That is, on the symbol including the CSI-RS, the first terminal device reduces the transmit power of the PSSCH.

In addition, because $$\beta_{CSI-RS,2} = \beta_{DM-RS,3}^{PSSCH} * \sqrt{\frac{n_{layer}^{PSSCH}}{Q_p}},$$

the power control factor of the CSI-RS is related to $\beta_{DM-RS,3}^{PSSCH}$, that is, related to the power control factor of the PSSCH on the symbol including the CSI-RS. When the power of the PSSCH on the symbol including the CSI-RS is reduced, it means that on the symbol including the CSI-RS, the power control factor of the CSI-RS is also reduced, that is, the first terminal device also reduces the transmit power of the CSI-RS.

An execution order of S501 and S502 is not limited in this embodiment of this application. S501 may be performed first, or S502 may be performed first, or S501 and S502 may be performed at the same time.

S503: The second terminal device determines CSI based on the CSI-RS.

In some embodiments, because the frequency-domain bandwidth of the CSI-RS is the same as the frequency-domain bandwidth of the resource pool, the second terminal device measures CSI-RSs of all sub-channels included in the resource pool to obtain CSI corresponding to all the sub-channels. In this embodiment of this application, in different implementations, specific content included in the CSI may be different. Two possible manners are described below. It should be noted that during actual implementation, a manner other than the two manners can also be used. This is not limited in this embodiment of this application.

Manner 1: The CSI includes at least one of the following parameters: a wideband CQI index and CQI values of the one or more sub-channels in the resource pool.

The wideband CQI index is a CQI index corresponding to the frequency-domain bandwidth of the CSI-RS. Because the frequency-domain bandwidth of the CSI-RS is the same as the frequency-domain bandwidth of the resource pool, herein, the wideband CQI index is referred to as the CQI index corresponding to the frequency-domain bandwidth of the resource pool. The wideband CQI index may be used to represent overall channel quality of the resource pool. A larger CQI index indicates better overall channel quality of the resource pool.

A CQI value of one sub-channel in the resource pool corresponds to a CQI index of one sub-channel in the resource pool. The CQI value corresponding to the sub-channel is determined by a sub-channel CQI index and a wideband CQI index of the sub-channel. A sub-channel CQI index of a sub-channel is used to represent sub-channel quality of the sub-channel. A larger CQI index indicates better sub-channel quality of the sub-channel.

In some embodiments, the sub-channel CQI index and the wideband CQI index may be 4 bits. The CQI value is k bits, and k may be one in {2, 3}.

For example, if the frequency-domain bandwidth of the SL CSI-RS corresponds to y sub-channels, where y is a positive integer, when the frequency-domain bandwidth of the SL CSI-RS is the same as the frequency-domain bandwidth of the resource pool, the quantity of sub-channels corresponding to the resource pool satisfies that Y=y. In this case, the CQI calculated by the receive end, namely, the second terminal device, includes 4 bits of wideband CQI index and/or y*k bits of CQI value. The CSI includes the CQI and for example, 1 bit of rank indicator (RI).

It should be noted that for a manner of calculating the wideband CQI index by the second terminal device, refer to a conventional technology. That the second terminal device calculates the sub-channel CQI index may be implemented as: The second terminal device measures, at a granularity of a sub-channel, sub-channel CQI indexes corresponding to all sub-channels in the resource pool.

The following describes a manner for determining a CQI value of a sub-channel based on a wideband CQI index and a sub-channel CQI index. For a sub-channel with an index s (where s is a non-negative integer), a sub-channel offset level is determined based on a sub-channel CQI index and a wideband CQI index of the sub-channel and the following formula: sub-channel offset level (s)=sub-channel CQI index (s)−wideband CQI index. Subsequently, the CQI value of the sub-channel with the index s is determined based on a sub-channel offset level of the sub-channel and Table 2.

TABLE 2

| CQI value | Sub-channel offset level |
|---|---|
| 0 | 0 |
| 1 | 1 |
| 2 | ≥2 |
| 3 | ≤−1 |

Manner 2: The CSI includes at least one of the following parameters: a wideband CQI index and sub-channel CQI indexes of one or more sub-channels in a resource pool. For a calculation manners of the wideband CQI index and the sub-channel CQI index, refer to the calculation manner in manner 1. Details are not described herein again.

For example, in this implementation, if the frequency-domain bandwidth of the SL CSI-RS corresponds to y sub-channels, where y is a positive integer, when the frequency-domain bandwidth of the SL CSI-RS is the same as the frequency-domain bandwidth of the resource pool, the quantity of sub-channels corresponding to the resource pool satisfies that Y=y. In this case, the CQI calculated by the receive end, namely, the second terminal device, includes 4 bits of wideband CQI index and/or 4*y bits of sub-channel CQI index.

According to the method provided in this embodiment of this application, the frequency-domain bandwidth of the CSI-RS is the same as the frequency-domain bandwidth of the resource pool. Therefore, the CSI obtained by the second terminal device by measuring the CSI-RS includes the wideband CQI index and/or the CQI values of the one or more sub-channels in the resource pool, in other words, the second terminal device measures and feeds back the CSI of each sub-channel in the resource pool to the first terminal device. Further, the first terminal device can select a proper resource based on the CSI of each sub-channel in the resource pool to optimize frequency hopping communication in an SL scenario and improve the communication capacity in the SL scenario.

Furthermore, in the conventional technology, the CSI is very likely to include only 1 bit of RI and 4 bits of wideband CQI index (which is used to represent average channel quality of one or more sub-channels), and content of fed back CSI is little. However, in the method provided in this embodiment of this application, the CSI includes the wideband CQI index and/or the CQI values of the one or more sub-channels in the resource pool, and information content carried in the CS is more informative, so that the first terminal device can learn of more information based on the CSI.

S504: The second terminal device sends the CSI to the first terminal device.

Correspondingly, the first terminal device receives the CSI from the second terminal device.

The CSI is carried in a MAC CE, in other words, the MAC CE carries the CSI. That is, S504 may be implemented as: The second terminal device sends a MAC CE to the first terminal device, where the MAC CE carries CSI. Correspondingly, the first terminal device receives the MAC CE from the second terminal device.

A quantity of bytes (octet) occupied by a MAC CE carrying CSI is related to the quantity of sub-channels in the resource pool. In other words, in this embodiment of this application, the MAC CE has a variable size.

Usually, 1 byte occupies 8 bits.

In a possible implementation, corresponding to manner 1, the CSI includes a wideband CQI index and/or CQI values of one or more sub-channels in the resource pool. In some embodiments, the MAC CE carrying the CSI includes 1+⌈y/4⌉ bytes (octet), where ⌈x⌉ is a round up symbol, and y is the quantity of sub-channels in the resource pool. That is, the MAC CE carrying the CSI may be 1+⌈y/4⌉ bytes or may be greater than 1+⌈y/4⌉ bytes. This is not limited in embodiments of this application.

In a possible implementation, corresponding to manner 1, the MAC CE includes a first byte and ⌈y/4⌉ bytes. The first byte corresponds to the RI and the wideband CQI index. In other words, the first byte occupied by the MAC CE carries the RI and the wideband CQI index. ⌈y/4⌉ bytes correspond to (or carry) CQI values of one or more sub-channels. Any one of the CQI values of the one or more sub-channels is indicated by 2 bits.

For example, if it is assumed that the quantity of sub-channels included in the resource pool satisfies that y=4, the CQI value occupies k=2 bits. In the MAC CE shown in FIG. 7, the first byte is Oct 1, and Oct 1 carries, for example, 1 bit of RI and 4 bits of wideband CQI index.

It should be noted that positions of the 1 bit of RI and the 4 bits of wideband CQI index in Oct 1 are not limited in this embodiment of this application. For example, these 5 bits may be the first 5 bits or the last 5 bits in Oct 1, or may be located at other positions. In addition, the remaining 3 bits in the first byte are not limited in this embodiment of this application. In some embodiments, the remaining 3 bits may be reserved bits, represented as R; or are used for another purpose.

For a byte other than the first byte in the MAC CE, for example, Oct 2 shown in FIG. 7, 8 bits, namely, T0, T1, . . . , and T7, in Oct 2 carry a total of 8 bits of CQI value. A carrying manner is not limited in this embodiment of this application. For example, for y=4 sub-channels with indexes 0, 1, 2, and 3, T0 and T1 carry a CQI value of the sub-channel with the index 0, T2 and T3 carry a CQI value of the sub-channel with the index 1, and the rest may be deduced by analogy.

In some other embodiments, because the CSI may carry a precoding matrix indicator (PMI) and/or the reference signal received power (RSRP) and/or other information in the future, the quantity of bytes, carrying the CSI, in the MAC CE may be greater than $1+\lceil y/4 \rceil$.

In a possible implementation, corresponding to manner 2, the CSI includes a wideband CQI index and/or CQI indexes of one or more sub-channels in the resource pool. In some embodiments, the MAC CE carrying the CSI includes a second byte and a third byte set. A quantity of bytes included in the third byte set is less than or equal to $\lceil y/2 \rceil$, where $\lceil x \rceil$ is a round up symbol, and y is the quantity of sub-channels in the resource pool.

For example, when y=3, the MAC CE carrying the CSI includes the second byte and other bytes (less than $\lceil 3/2 \rceil$). That is, when y=3, it is possible that 2 bytes, instead of $1+\lceil 3/2 \rceil=3$ bytes, are required to transmit the CSI.

In a possible implementation, corresponding to manner 2, a first part of the second byte carries an RI, and a second part of the second byte carries a sub-channel CQI index. The third byte set carries remaining y−1 sub-channel CQI indexes.

For example, it is assumed that the quantity of sub-channels in the resource pool satisfies that y=4, and a structure of the MAC CE is shown in FIG. 8. The MAC CE includes a second byte, namely, Oct 1, and $\lceil y/2 \rceil=2$ bytes other than Oct 1, namely, Oct 2 and Oct 3.

4 bits in Oct 1 carry 1 bit of RI. Remaining 3 bits in the 4 bits are not limited in this embodiment of this application, and may be reserved bits, represented as R. The remaining 4 bits, T0, T1, T2, and T3, in Oct 1 carry 4 bits, that is, 1 sub-channel CQI index.

In Oct 2, T4, T5, . . . , and T11 carry 8 bits, that is, 2 sub-channel CQI indexes.

In Oct 3, T12, T13, T14, and T15 carry 4 bits, that is, 1 sub-channel CQI index. Remaining 4 bits in Oct 3 are not limited in this embodiment of this application, and may be reserved bits, represented as R.

In a possible implementation, corresponding to manner 2, the second byte carries the RI, and the third byte set carries the sub-channel CQI index.

For example, the quantity of sub-channels included in the resource pool satisfies that y=4, and a structure of the MAC CE is shown in FIG. 9. The MAC CE includes a second byte (Oct 1) and $\lceil y/2 \rceil=2$ other bytes (Oct 2 and Oct 3).

Oct 1 carries, for example, 1 bit of RI. Remaining 7 bits in Oct 1 are not limited in this embodiment of this application, and may be reserved bits, represented as R. In Oct 2 and Oct 3, T0, T1, . . . , and T15 carry 16 bits, that is, 4 sub-channel CQI indexes. Specific carrying manners of Oct 2 and Oct 3 are not limited in this embodiment of this application. For example, for y=4 sub-channels with indexes 0, 1, 2, and 3, T0, T1, T2, T3 carry a sub-channel CQI index corresponding to the sub-channel with the index 0; T4, T5, T6, and T7 carry a sub-channel CQI index corresponding to the sub-channel with the index 1; and the rest may be deduced by analogy.

In some other embodiments, because the CSI may carry information such as a PMI and an RSRP in the future, corresponding to manner 1, the quantity of bytes included in the MAC CE may be greater than $1+\lceil y/2 \rceil$.

According to the communication method provided in this embodiment of this application, in an SL scenario, the frequency-domain bandwidth of the CSI-RS is the same as the frequency-domain bandwidth of the resource pool, in other words, a quantity of sub-channels included in the CSI-RS in frequency domain is the same as a quantity of sub-channels included in the resource pool in frequency domain. Therefore, after the first terminal device sends the CSI-RS to the second terminal device, the second terminal device can measure and feed back CSI of each sub-channel in the resource pool to the first terminal device based on the CSI-RS. Further, the first terminal device can properly select a frequency domain resource based on the CSI of each sub-channel in the resource pool to optimize frequency hopping communication in an SL scenario and improve the resource utilization rate and the communication capacity in the SL scenario.

In addition, according to the method provided in this embodiment of this application, when determining that one or more sub-channels currently used for transmission have very poor channel quality, the first terminal device can determine, based on the CSI of all the sub-channels in the resource pool, whether another sub-channel in the resource pool can implement reliable transmission, and further switch to the another sub-channel for transmission, improving transmission reliability in the SL scenario.

Figure 10:
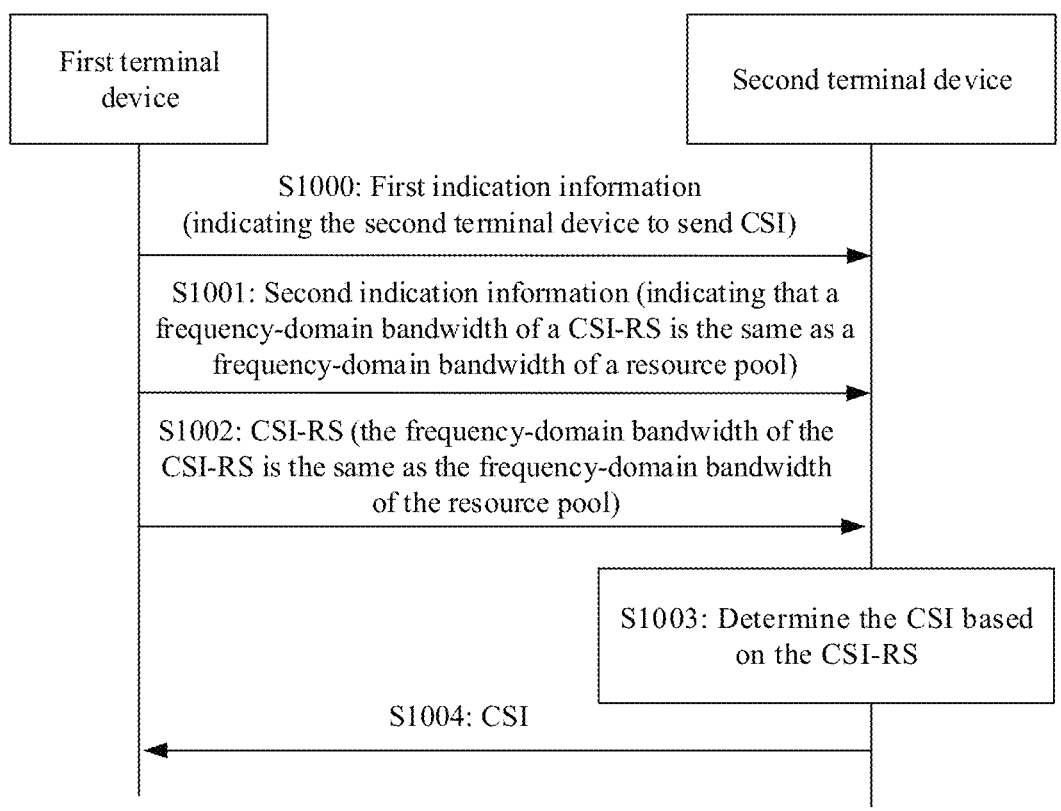
FIG. 10 is a schematic flowchart of another communication method according to some embodiments of the present disclosure.

In some embodiments, the embodiments of this application further provide at least two methods for indicating that a frequency-domain bandwidth of a CSI-RS is the same as a frequency-domain bandwidth of a resource pool. FIG. 10 shows a method for indicating that a frequency-domain bandwidth of a CSI-RS is the same as a frequency-domain bandwidth of a resource pool according to an embodiment of this application. The method includes the following operations.

S1000: A first terminal device sends first indication information to a second terminal device.

Correspondingly, the second terminal device receives the first indication information from the first terminal device.

It should be understood that in this implementation, the first indication information may be 1 bit, the same as that in a conventional technology, in $2^{nd}$ stage SCI. In other words, for an implementation of the first indication information, refer to the conventional technology.

In some embodiments, for an implementation of operation S1000, refer to that of operation S501. Details are not described herein again.

S1001: The first terminal device sends second indication information to the second terminal device.

Correspondingly, the second terminal device receives the second indication information from the first terminal device.

The second indication information is used to indicate that a frequency-domain bandwidth of a CSI-RS is the same as a frequency-domain bandwidth of a resource pool. In some embodiments, the second indication information is included in RRC signaling. In the SL scenario, the RRC signaling may be PC5 RRC signaling.

It should be understood that to enable the receive end, namely, the second terminal device, to learn of that a frequency-domain bandwidth of an SL CSI-RS is the same as a frequency-domain bandwidth of an associated resource pool, when the transmit end, namely, the first terminal device, configures an SL CSI-RS pattern for the second terminal device by using the PC5 RRC signaling, that the frequency-domain bandwidth of the SL CSI-RS is the same as the frequency-domain bandwidth of the resource pool needs to be indicated.

In a possible implementation, the second indication information corresponds to a field sl-CSI-RS-freqBand in the PC5 RRC signaling, and the first terminal device indicates, by using this field, the frequency-domain bandwidth corresponding to the SL CSI-RS pattern:

sl-CSI-RS-freqBand ENUMERATED {txPSSCH, txResourcePool} where ENUMERATED indicates to select one of a plurality of parameters, txPSSCH is used to indicate that the frequency-domain bandwidth of the SL CSI-RS is the same as a frequency-domain bandwidth of an associated PSSCH, txResourcePool is used to indicate that the frequency-domain bandwidth of the SL CSI-RS is the same as the frequency-domain bandwidth of the associated resource pool. The first terminal device sets the field sl-CSI-RS-freqBand to txResourcePool, so that the second terminal device leans of that the frequency-domain bandwidth of the SL CSI-RS is the same as the frequency-domain bandwidth of the associated resource pool.

In this way, after receiving the second indication information, the second terminal device can determine that the frequency-domain bandwidth of the CSI-RS is the same as the frequency-domain bandwidth of the resource pool.

S1002: The first terminal device sends an SL CSI-RS to the second terminal device.

Correspondingly, the second terminal device receives the SL CSI-RS from the first terminal device.

In some embodiments, for an implementation of operation S1002, refer to that of operation S502. Details are not described herein again.

S1003: The second terminal device determines CSI based on the CSI-RS.

In some embodiments, for an implementation of operation S1003, refer to that of operation S503. Details are not described herein again.

It should be understood that after receiving the CSI-RS, the second terminal device may measure channel quality of all sub-channels in the resource pool.

S1004: The second terminal device sends the CSI to the first terminal device.

Correspondingly, the first terminal device receives the CSI from the second terminal device.

In some embodiments, for an implementation of operation S1004, refer to that of operation S504. Details are not described herein again.

It should be noted that an execution order of S1000, S1001, and S1002 is not limited in this embodiment of this application.

As can be concluded from the above, compared with the procedure in FIG. 5, the procedure in FIG. 10 further includes reception and transmission of the second indication information, and the first terminal device indicates the frequency-domain bandwidth of the CSI-RS by using the second indication information.

Figure 11:
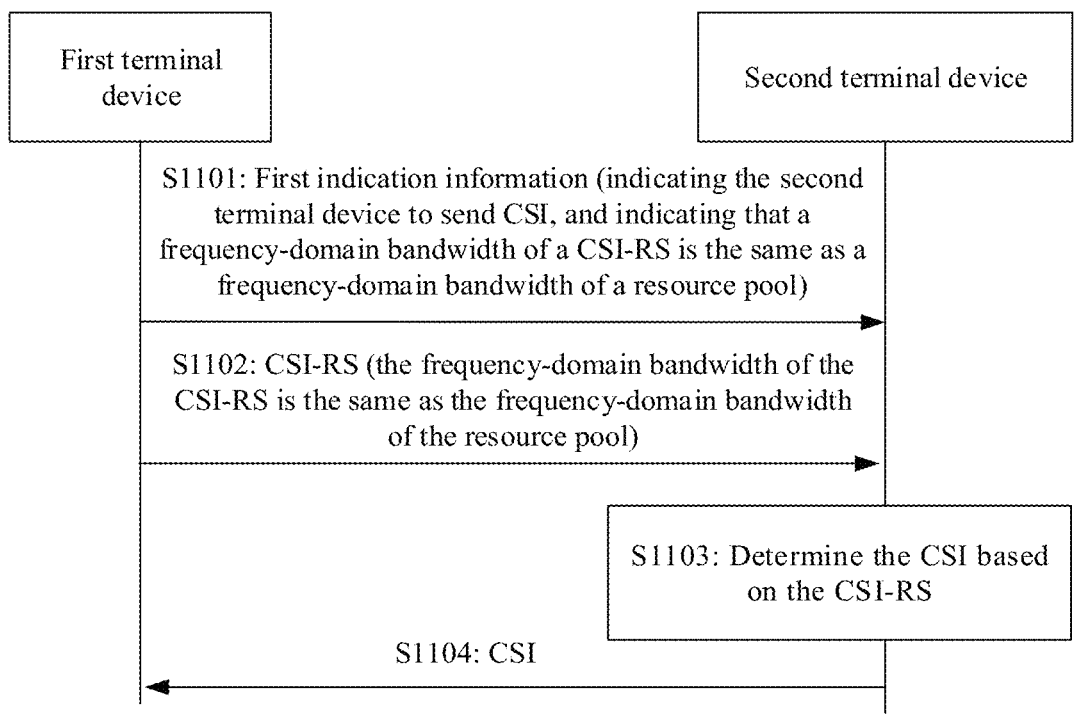
FIG. 11 is a schematic flowchart of another communication method according to some embodiments of the present disclosure.

FIG. 11 shows another method for indicating that a frequency-domain bandwidth of a CSI-RS is the same as a frequency-domain bandwidth of a resource pool according to an embodiment of this application. The frequency-domain bandwidth of the CSI-RS may be indicated by using the foregoing first indication information. The method includes the following operations.

S1101: A first terminal device sends first indication information to a second terminal device.

Correspondingly, the second terminal device receives the first indication information from the first terminal device.

The first indication information is used to indicate the second terminal device to send CSI, and is further used to indicate that the frequency-domain bandwidth of the CSI-RS is the same as the frequency-domain bandwidth of the resource pool.

Different from the embodiment corresponding to FIG. 10, in this embodiment, the first indication information is one it, different from that in the conventional technology, in 2nd stage SCI. For example, in the embodiment corresponding to FIG. 10, the first indication information may be 1 bit in the conventional technology. However, in this embodiment, the first indication information is 1 bit different from that in the conventional technology. If the second terminal device receives 1 bit different from that in the conventional technology, it is considered that the frequency-domain bandwidth of the CSI-RS is the same as the frequency-domain bandwidth of the associated resource pool.

S1102: The first terminal device sends an SL CSI-RS to the second terminal device.

Correspondingly, the second terminal device receives the SL CSI-RS from the first terminal device.

In some embodiments, for an implementation of operation S1102, refer to that of operation S502. Details are not described herein again.

S1103: The second terminal device determines CSI based on the CSI-RS.

In some embodiments, for an implementation of operation S1103, refer to that of operation S503. Details are not described herein again.

It should be understood that after receiving the CSI-RS, the second terminal device may measure channel quality of all sub-channels in the resource pool.

S1104: The second terminal device sends the CSI to the first terminal device.

Correspondingly, the first terminal device receives the CSI from the second terminal device.

In some embodiments, for an implementation of operation S1104, refer to that of operation S504. Details are not described herein again. It should be noted that an execution order of S1101 and S1102 is not limited in this embodiment of this application.

As can be learned, compared with the procedure in FIG. 5, in the procedure in FIG. 11, the first indication information is used to indicate the second terminal device to send CSI, and is further used to indicate that the frequency-domain bandwidth of the CSI-RS is the same as the frequency-domain bandwidth of the resource pool.

In a conventional technology, a frequency-domain bandwidth of a CSI-RS is configured by using RRC signaling, requiring relatively large signaling overheads and having a relatively strict limitation on the frequency-domain bandwidth of the CSI-RS and a position of an initial PRB. However, in this embodiment of this application, the PC5 RRC signaling or the first indication information is used to indicate that the frequency-domain bandwidth of the SL CSI-RS is the same as the frequency-domain bandwidth of the resource pool. Therefore, the signaling overheads can be reduced.

An embodiment of this application further provides a communication method. In the method, a frequency-domain bandwidth of a CSI-RS can be flexibly indicated. In some embodiments, as shown in FIG. 12, the method includes the following operations.

S1201: A first terminal device sends first indication information to a second terminal device.

Correspondingly, the second terminal device receives the first indication information from the first terminal device.

Figure 12:
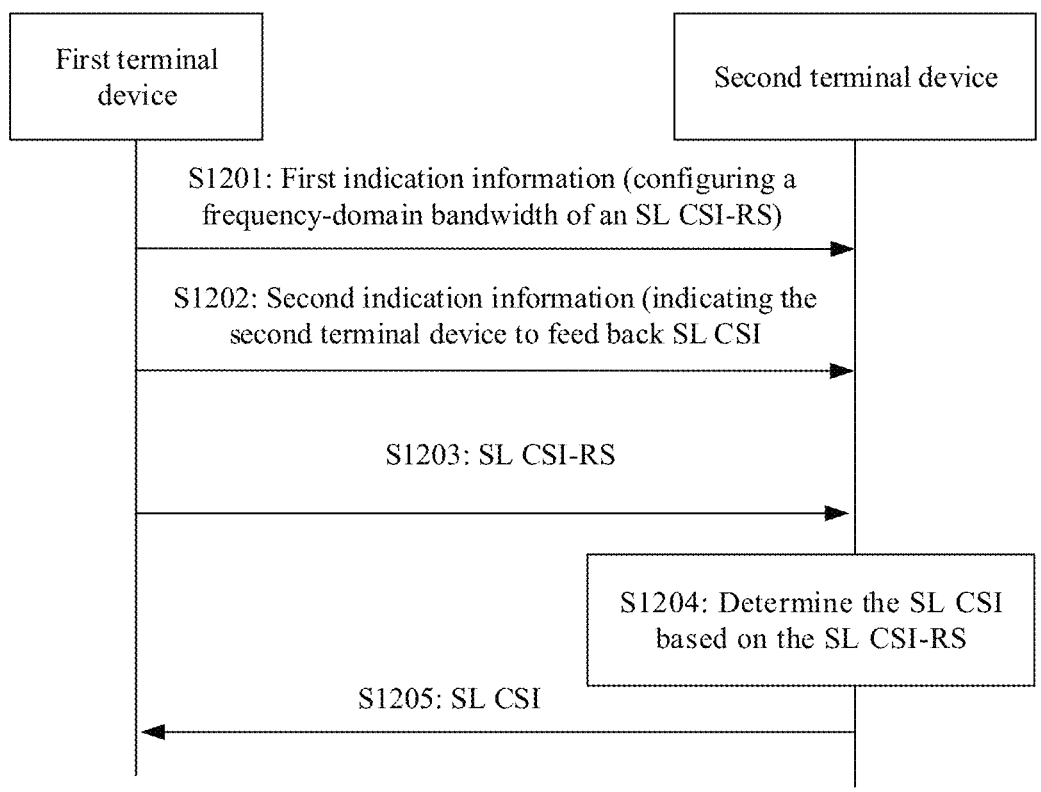
FIG. 12 is a schematic flowchart of another communication method according to some embodiments of the present disclosure.

It should be noted that the first indication information in the embodiment corresponding to FIG. 12 and the first indication information in other embodiments are not the same concept. In other embodiments, for example, in the embodiments corresponding to FIG. 5, FIG. 10, and FIG. 11, the first indication information is used to indicate the second terminal device to send the CSI. In the embodiment corresponding to FIG. 12, the first indication information is used to indicate a frequency-domain bandwidth of an SL CSI-RS. In some embodiments, the first indication information is included in PC5 RRC signaling.

In some embodiments, the first indication information in the PC5 RRC signaling is as follows:

```
sl-CSI-FrequencyOccupation ::= SEQUENCE{
    startingSubChannel      INTEGER (0 ... M),
    nrofSubChannels         INTEGER (1 ... N),
    ...
}
``` where sl-CSI-FrequencyOccupation is used to indicate the frequency-domain bandwidth of the SL CSI-RS; startingSubChannel indicates a position of the SL CSI-RS on an initial sub-channel in a resource pool in frequency domain, a value range of this parameter is greater than or equal to 0 and less than or equal to M, this parameter is an integer, M is a positive integer, and in some embodiments, M=26; nrofSubChannels indicates a quantity of sub-channels corresponding to the frequency-domain bandwidth of the SL CSI-RS, a value range of this parameter is greater than or equal to 1 and less than or equal to N, this parameter is an integer, N is a positive integer, and in some embodiments, N=27.

Figure 13:
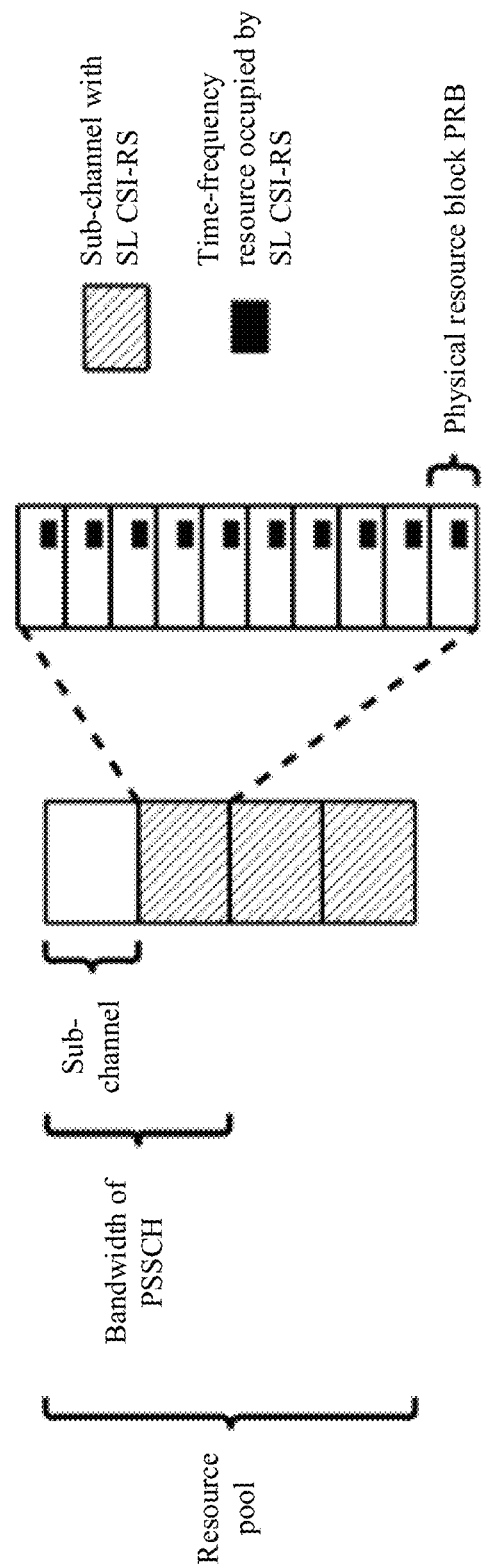
FIG. 13 is a schematic diagram of another bandwidth according to some embodiments of the present disclosure.

For example, in FIG. 13, a resource pool includes 4 sub-channels, and each sub-channel includes 10 PRBs. A frequency-domain bandwidth of a PSSCH is 2 sub-channels, that is, 20 PRBs. Among the frequency-domain bandwidth parameters of the SL CSI-RS, if startingSubChannel is 0 and nrofSubChannels is 3, the quantity of sub-channels corresponding to the frequency-domain bandwidth of the SL CSI-RS satisfies that y=3, and the SL CSI-RS exists on sub-channels 0, 1, and 2 in the resource pool. FIG. 10 shows time-frequency resources occupied by the SL CSI-RS on one of the sub-channels. It can be learned that 10 PRBs corresponding to the sub-channel each have an SL CSI-RS. The SL CSI-RS in each PRB has a same quantity of ports, a same time domain position, and a same frequency domain position.

S1202: The first terminal device sends second indication information to the second terminal device.

Correspondingly, the second terminal device receives the second indication information from the first terminal device.

It should be noted that the second indication information in the embodiment corresponding to FIG. 12 is different from the second indication information in other embodiments of this application. In other embodiments, for example, in the embodiments corresponding to FIG. 5, FIG. 10, and FIG. 11, the second indication information is used to indicate that a frequency-domain bandwidth of a CSI-RS is the same as a frequency-domain bandwidth of a resource pool. In the embodiment corresponding to FIG. 12, the second indication information is used to trigger the second terminal device to measure a channel and feed back SL CSI based on the SL CSI-RS. The second indication information is the same as the first indication information in the embodiment corresponding to FIG. 10.

For an implementation of S1202, refer to the related content of FIG. 10.

S1203: The first terminal device sends an SL CSI-RS to the second terminal device.

Correspondingly, the second terminal device receives the SL CSI-RS from the first terminal device.

For example, the frequency-domain bandwidth of the SL CSI-RS is shown in FIG. 13.

In some embodiments, if the frequency-domain bandwidth of the SL CSI-RS is different from a frequency-domain bandwidth of a PSSCH, to avoid introducing an AGC symbol, it needs to be ensured that the second terminal device has a same receive power on all OFDM symbols. Therefore, the first terminal device needs to adjust a transmit power when sending the SL CSI-RS.

In a possible implementation, the first terminal device calculates a power control factor $\beta_{CSI-RS,1}$ of the CSI-RS by using the following formula:

$$\beta_{CSI-RS,1} = \beta_{DM-RS,3}^{PSSCH} * \sqrt{\frac{W*Z}{(W-U)*Z + U*(Z-Q_p) + y*n_{layer}^{PSSCH}}} * \sqrt{\frac{n_{layer}^{PSSCH}}{Q_p}},$$

where
$\beta_{DM-RS,3}^{PSSCH}$ is a power control factor of a PSSCH on an OFDM symbol configured to transmit an SL CSI-RS; W is a quantity of sub-channels of a PSSCH bandwidth, Z is a quantity of PRBs included in one sub-channel in the resource pool, U is a quantity of sub-channels overlapped in a frequency-domain bandwidth of the PSSCH and a frequency-domain bandwidth of the SL CSI-RS (for example, as shown in FIG. 13, U=1), $Q_p$ is a quantity of ports of the SL CSI-RS, y is a quantity of sub-channels of the frequency-domain bandwidth of the SL CSI-RS, $n_{layer}^{PSSCH}$ is a quantity of scheduled layers of the PSSCH, y is less than or equal to Y, and Y is a quantity of sub-channels in the resource pool.

An expression of the power control factor, namely, $\beta_{DM-RS,3}^{PSSCH}$ of the PSSCH on an OFDM symbol including the SL CSI-RS is:

$$\beta_{DM-RS,3}^{PSSCH} = \beta_{DM-RS,2}^{PSSCH} * \sqrt{\frac{W*Z}{(W-U)*Z + U*(Z-Q_p) + y*n_{layer}^{PSSCH}}},$$

where
$\beta_{DM-RS,2}^{PSSCH}$ is the power control factor of the PSSCH on the OFDM symbol not configured to transmit the SL CSI-RS.

An execution order of S1201, S1202, and S1203 is not limited in this embodiment of this application.

S1204: The second terminal device determines SL CSI based on the SL CSI-RS.

In some embodiments, the second terminal device measures, based on the frequency-domain bandwidth of the SL CSI-RS, the sub-channel corresponding to the frequency-domain bandwidth. FIG. 13 is used as an example. The second terminal device measures three shaded sub-channels, and determines SL CSI corresponding to the three sub-channels.

S1205: The second terminal device feeds back the SL CSI to the first terminal device.

Correspondingly, the first terminal device receives the SL CSI from the second terminal device.

In a possible implementation, the second terminal device determines the CSI at a granularity of a sub-channel.

In some embodiments, the SL CSI includes at least one of the following parameters: a wideband CQI index and CQI values of one or more sub-channels corresponding to the frequency-domain bandwidth of the SL CSI-RS. The wideband CQI index is the CQI index corresponding to the frequency-domain bandwidth of the SL CSI-RS.

For example, as shown in FIG. 13, the SL CSI includes wideband CQI indexes (CQI indexes corresponding to a total bandwidth of the three shaded sub-channels) and/or CQI values corresponding to the three shaded sub-channels.

In some embodiments, the SL CSI includes at least one of the following parameters: a wideband CQI index and CQI indexes of one or more sub-channels corresponding to the frequency-domain bandwidth of the SL CSI-RS. For example, as shown in FIG. 13, the SL CSI includes the wideband CQI index and/or the sub-channel CQI indexes corresponding to the three shaded sub-channels.

For definitions of the wideband CQI index, the CQI value, and the sub-channel CQI index, refer to the foregoing descriptions.

In this embodiment of this application, the first terminal device sends an SL CSI-RS with a flexibly indicated frequency-domain bandwidth to the second terminal device. The second terminal device may be triggered to feed back SL CSI of one or more sub-channels (that is, sub-channels corresponding to a frequency-domain bandwidth of the SL CSI-RS). In this way, the first terminal device can select a frequency domain resource based on the CSI of the one or more sub-channels in the resource pool, optimizing frequency hopping communication in an SL scenario and improving a communication capacity in the SL scenario.

In addition, in a conventional technology, a frequency-domain bandwidth of a CSI-RS is configured by using RRC signaling, having a relatively strict limitation on the frequency-domain bandwidth of the CSI-RS and a position of an initial PRB. However, in this embodiment of this application, the frequency-domain bandwidth of the SL CSI-RS is configured by using PC5 RRC signaling, and a parameter such as the initial PRB does not need to be limited.

An embodiment of this application further provides a communication method. A second terminal device can calculate CQI at a granularity of a sub-channel. The method includes the following operations.

1. A first terminal device sends first indication information to the second terminal device.

Correspondingly, the second terminal device receives the first indication information from the first terminal device.

It should be noted that the first indication information in the method may be the first indication information shown in FIG. 10.

2. The first terminal device sends an SL CSI-RS to the second terminal device.

Correspondingly, the second terminal device receives the SL CSI-RS from the first terminal device.

In some embodiments, the SL CSI-RS may be an SL CSI-RS in a conventional technology, in other words, a frequency-domain bandwidth is the same as a frequency-domain bandwidth of a PSSCH.

An execution order of operation 1 and operation 2 is not limited in this embodiment of this application.

3. The second terminal device calculates SL CSI at a granularity of a sub-channel based on the SL CSI-RS.

In some embodiments, the SL CSI includes at least one of the following parameters: a wideband CQI index and CQI values of one or more sub-channels corresponding to the frequency-domain bandwidth of the SL CSI-RS.

In some embodiments, the SL CSI includes at least one of the following parameters: a wideband CQI index and CQI indexes of one or more sub-channels corresponding to the frequency-domain bandwidth of the SL CSI-RS.

For an implementation of this operation, refer to the operations in the foregoing embodiments, for example, operation S503.

4. The second terminal device feeds back the SL CSI to the first terminal device.

Correspondingly, the first terminal device receives the SL CSI from the second terminal device.

For an implementation of this operation, refer to the operations in the foregoing embodiments, for example, operation S504.

In some embodiments, the method of calculating CQI at a granularity of a sub-channel may further be combined with the methods in the foregoing embodiments. For example, the frequency-domain bandwidth of the SL CSI-RS is the same as the frequency-domain bandwidth of the associated PSSCH or the frequency-domain bandwidth of the associated resource pool. For another example, with reference to the embodiment corresponding to FIG. 12, the frequency-domain bandwidth of the SL CSI-RS may be indicated flexibly.

In this embodiment of this application, the second terminal device feeds back, to the first terminal device, the SL CSI obtained through measurement performed at the granularity of a sub-channel, so that the first terminal device can determine channel quality of one or more sub-channels. In this way, the first terminal device can optimize resource allocation based on the channel quality of the one or more sub-channels, improving resource use efficiency of a resource pool in an SL scenario and improving a communication capacity in the SL scenario.

In addition, according to the method provided in this embodiment of this application, when determining that one or more sub-channels currently used for transmission have very poor channel quality, the first terminal device can try to switch to another sub-channel for transmission, improving transmission reliability in the SL scenario.

It may be understood that, to implement the foregoing functions, the first terminal device and the second terminal device in this embodiment of this application include corresponding hardware structures and/or software modules for performing each function. With reference to the units and algorithm operations described in embodiments disclosed in this application, embodiments of this application can be implemented in a form of hardware or hardware and computer software. Whether a function is performed by hardware or hardware driven by computer software depends on a particular application and a design constraint of the technical solutions. A person skilled in the art may use different methods to implement the described functions for each particular application, but it should not be considered that the implementation falls beyond the scope of the technical solutions in embodiments of this application.

In the embodiments of this application, the first terminal device and the second terminal may be divided into functional units based on the foregoing method examples. For example, the function units may be obtained through division in a one-to-one correspondence with the functions, or two or more functions may be integrated into one processing unit. The integrated unit may be implemented in a form of hardware, or may be implemented in a form of a software function unit. It should be noted that, in embodiments of this application, division into the units is an example, and is merely logical function division. During actual implementation, another division manner may be used.

Figure 14:
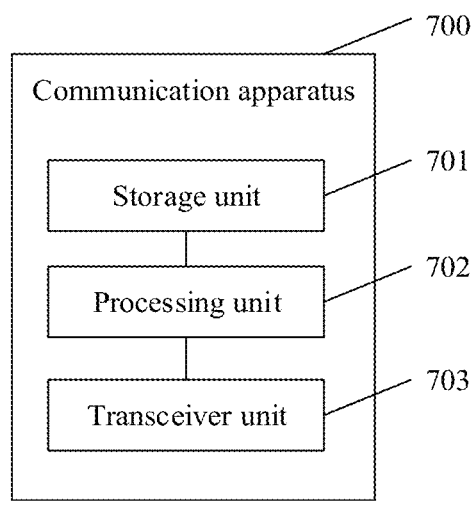
FIG. 14 is a schematic diagram of a structure of a communication apparatus according to some embodiments of the present disclosure.

FIG. 14 is a schematic block diagram of a communication apparatus according to an embodiment of this application. The communication apparatus may be the first terminal device described above or an apparatus (for example, a chip system) supporting the functions of the first terminal device. The communication apparatus 700 may exist in a form of software, or may be a chip that may be used in a device. The communication apparatus 700 includes a processing unit 702 and a transceiver unit 703. In some embodiments, the transceiver unit 703 may further be divided into a sending unit (not shown in FIG. 14) and a receiving unit (not shown in FIG. 14). The sending unit is configured to support the communication apparatus 700 in sending information to another network element. The receiving unit is configured to support the communication apparatus 700 in receiving information from another network element.

In some embodiments, the communication apparatus 700 may further include a storage unit 701, configured to store program code and data of the communication apparatus 700. The data may include but is not limited to raw data, intermediate data, or the like.

The processing unit 702 may be configured to support the first terminal device in determining a CSI-RS, first indication information, second indication information, third indication information, and/or other processes in the solutions described in the specification.

The transceiver unit 703 is configured to send the CSI-RS to a second terminal device.

A frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap in time domain.

In some embodiments, the transceiver unit 703 is further configured to send the first indication information to the second terminal device, where the first indication information is used to indicate the second terminal device to send channel state information CSI, and the first indication information is included in $2^{nd}$ stage sidelink control information SCI.

In some embodiments, the first indication information is further used to indicate that the frequency-domain bandwidth of the CSI-RS is the same as the frequency-domain bandwidth of the resource pool.

In some embodiments, the transceiver unit 703 is further configured to send second indication information to the second terminal device, where the second indication information is used to indicate that the frequency-domain bandwidth of the CSI-RS is the same as the frequency-domain bandwidth of the resource pool.

In some embodiments, the second indication information is included in radio resource control RRC signaling.

In some embodiments, the CSI includes at least one of the following:

a wideband channel quality indication CQI index, where the wideband CQI index is a CQI index corresponding to the frequency-domain bandwidth of the CSI-RS; and CQI values of one or more sub-channels in the resource pool, where a CQI value of one sub-channel in the resource pool corresponds to a CQI index of one sub-channel in the resource pool.

In some embodiments, the CSI is carried in a media access control control element MAC CE, and a quantity of bytes occupied by the MAC CE is related to a quantity of sub-channels in the resource pool.

In some embodiments, the MAC CE includes $1+\lceil y/4 \rceil$ bytes, $\lceil x \rceil$ is a round up symbol, and y is the quantity of sub-channels in the resource pool.

In some embodiments, a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

where $\beta_{DM-RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}} \text{; and}$$

$$\beta_{DM-RS,3}^{PSSCH} = \beta_{DM-RS,2}^{PSSCH} * \sqrt{\frac{W*Z}{W*(Z-Q_p) + Y*n_{layer}^{PSSCH}}},$$

where $\beta_{DM-RS,3}^{PSSCH}$ is a power control factor of a physical sidelink shared channel PSSCH on a symbol configured to transmit the CSI-RS, $\beta_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

Figure 15:
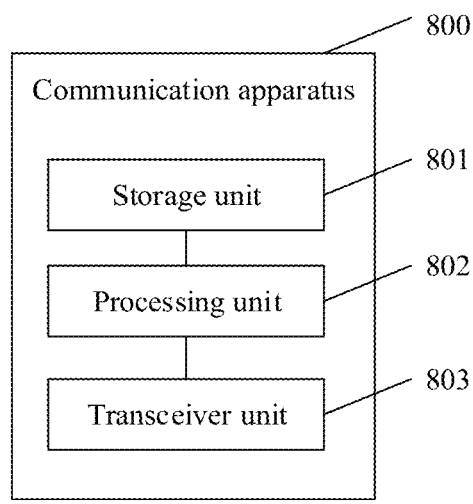
FIG. 15 is a schematic diagram of a structure of another communication apparatus according to some embodiments of the present disclosure.

FIG. 15 is a schematic diagram of a structure of another communication apparatus according to an embodiment of this application. The communication apparatus may be the second terminal device described above or an apparatus (for example, a chip system) supporting the functions of the second terminal device. The communication apparatus 800 may exist in a form of software, or may be a chip that may be used in a device. The communication apparatus 800 includes a processing unit 802 and a transceiver unit 803. In some embodiments, the transceiver unit 803 may further be divided into a sending unit (not shown in FIG. 15) and a receiving unit (not shown in FIG. 15). The sending unit is configured to support the communication apparatus 800 in sending information to another network element. The receiving unit is configured to support the communication apparatus 800 in receiving information from another network element.

In some embodiments, the communication apparatus 800 may further include a storage unit 801, configured to store program code and data of the communication apparatus 800. The data may include but is not limited to raw data, intermediate data, or the like.

The processing unit 802 may be configured to support the second terminal device in determining CSI based on a CSI-RS and/or other processes in the solutions described in the specification.

The transceiver unit 803 is configured to receive a channel state information-reference signal CSI-RS from a first terminal device.

A frequency-domain bandwidth of the CSI-RS is the same as a frequency-domain bandwidth of a resource pool, the resource pool is a time-frequency resource set included in a sidelink SL bandwidth part BWP, the resource pool includes one or more consecutive sub-channels in frequency domain, one sub-channel in the resource pool includes one or more consecutive physical resource blocks PRBs, and the resource pool is determined based on a periodic bitmap in time domain.

In some embodiments, the transceiver unit 803 is further configured to receive first indication information from the first terminal device, where the first indication information is used to indicate the second terminal device to send channel state information CSI, and the first indication information is included in $2^{nd}$ stage sidelink control information SCI.

In some embodiments, the first indication information is further used to indicate that the frequency-domain bandwidth of the CSI-RS is the same as the frequency-domain bandwidth of the resource pool.

In some embodiments, the transceiver unit 803 is further configured to receive second indication information from the first terminal device, where the second indication information is used to indicate that the frequency-domain bandwidth of the CSI-RS is the same as the frequency-domain bandwidth of the resource pool.

In some embodiments, the second indication information is included in radio resource control RRC signaling.

In some embodiments, the CSI includes at least one of the following:

a wideband channel quality indication CQI index, where the wideband CQI index is a CQI index corresponding to the frequency-domain bandwidth of the CSI-RS; and CQI values of one or more sub-channels in the resource pool, where a CQI value of one sub-channel in the resource pool corresponds to a CQI index of one sub-channel in the resource pool.

In some embodiments, the CSI is carried in a media access control control element MAC CE, and a quantity of bytes occupied by the MAC CE is related to a quantity of sub-channels in the resource pool.

In some embodiments, the MAC CE includes 1+⌈y/4⌉ bytes, ⌈x⌉ is a round up symbol, and y is the quantity of sub-channels in the resource pool.

In some embodiments, a power control factor $\beta_{CSI\text{-}RS,1}$ of the CSI-RS satisfies the following relationship:

$$\beta_{CSI\text{-}RS,1} = \beta_{DM\text{-}RS,1}^{PSSCH} * \sqrt{\frac{W}{Y}} * \sqrt{\frac{n_{layer}^{PSSCH}}{Q_p}},$$

where $\beta_{DM\text{-}RS,1}^{PSSCH}$ is a power control factor of a physical sidelink shared channel PSSCH, W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In some embodiments, a power control factor $\beta_{CSI\text{-}RS,1}$ of the CSI-RS satisfies the following relationship:

$$\beta_{CSI\text{-}RS,1} = \beta_{DM\text{-}RS,3}^{PSSCH} * \sqrt{\frac{n_{layer}^{PSSCH}}{Q_p}}; \text{ and}$$

$$\beta_{DM\text{-}RS,3}^{PSSCH} = \beta_{DM\text{-}RS,2}^{PSSCH} * \sqrt{\frac{W*Z}{W*(Z-Q_p)+Y*n_{layer}^{PSSCH}}},$$

where $\beta_{DM\text{-}RS,3}^{PSSCH}$ is a power control factor of a physical sidelink shared channel PSSCH on a symbol configured to transmit the CSI-RS, $\beta_{DM\text{-}RS,2}^{PSSCH}$ is a power control factor of the PSSCH on a symbol not configured to transmit the CSI-RS, W is a quantity of sub-channels of a PSSCH bandwidth, Z is a quantity of PRBs included in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

In a possible manner, the processing unit 802 may be a controller, or a processor 401 or a processor 407 shown in FIG. 4, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing unit 802 may implement or execute logical blocks, modules, and circuits in various examples described with reference to content disclosed in this application. Alternatively, the processor may be a combination for implementing a computing function, for example, a combination of one or more microprocessors, or a combination of the DSP and a microprocessor. The transceiver unit 803 may be the communication interface 404 shown in FIG. 4, or may be a transceiver circuit or the like. The storage unit 801 may be the memory 403 shown in FIG. 4.

Persons of ordinary skill in the art may understand that all or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in this application, it should be understood that the disclosed system, apparatus, and method may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network device. Some or all of the units may be selected based on actual requirements to achieve the objectives of the solutions of embodiments.

In addition, functional units in embodiments of this application may be integrated into one processing unit, or each of the functional units may exist independently, or two or more units are integrated into one unit. The integrated unit may be implemented in a form of hardware, or may be implemented in a form of hardware in addition to a software functional unit.

Based on the foregoing descriptions of the implementations, persons skilled in the art may clearly understand that this application may be implemented by software in addition to a universal hardware platform or by hardware only. In most circumstances, the former is a preferred implementation. Based on such an understanding, the technical solutions of this application essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, or a network device) to perform the methods described in embodiments of this application.

The foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
   sending a channel state information-reference signal (CSI-RS) from a first terminal device to a second terminal device, wherein
   a frequency-domain bandwidth of the CSI-RS is the same as a frequency-domain bandwidth of a resource pool to send the CSI-RS over the entire resource pool, the resource pool is a time-frequency resource set comprised in a sidelink (SL) bandwidth part (BWP), the resource pool comprises one or more consecutive sub-channels in a frequency domain, one sub-channel in the resource pool comprises one or more consecutive physical resource blocks (PRBs), and the resource pool is determined based on a periodic bitmap in a time domain; and
   the CSI in the CSI-RS is carried in a media access control control element (MAC CE), and a quantity of bytes occupied by the MAC CE is related to a quantity of sub-channels in the resource pool.

2. The method according to claim 1, wherein the method further comprises:
   sending first indication information to the second terminal device, wherein the first indication information is used to indicate the second terminal device to send CSI, and the first indication information is comprised in $2^{nd}$ stage sidelink control information (SCI).

3. The method according to claim 2, wherein the first indication information is further used to indicate that the frequency-domain bandwidth of the CSI-RS is the same as the frequency-domain bandwidth of the resource pool.

4. The method according to claim 1, wherein the method further comprises:
   sending second indication information to the second terminal device, wherein the second indication information is used to indicate that the frequency-domain bandwidth of the CSI-RS is the same as the frequency-domain bandwidth of the resource pool.

5. The method according to claim 4, wherein the second indication information is comprised in radio resource control (RRC) signaling.

6. The method according to claim 1, wherein the CSI in the CSI-RS comprises at least one of the following:
   a wideband channel quality indication (CQI) index corresponding to the frequency-domain bandwidth of the CSI-RS; or
   CQI values of one or more sub-channels in the resource pool, wherein a CQI value of one sub-channel in the resource pool corresponds to a CQI index of one sub-channel in the resource pool.

7. The method according to claim 1, wherein the MAC CE comprises 1+[y/4] bytes, [x] is a round up symbol, and y is the quantity of sub-channels in the resource pool.

8. The method according to claim 1, wherein a power control factor $\beta_{CSI-RS,1}$ of the CSI-RS satisfies the following relationship:

$$\beta_{CSI-RS,1} = \beta_{DM-RS,1}^{PSSCH} * \sqrt{\frac{W}{Y}} * \sqrt{\frac{n_{layer}^{PSSCH}}{Q_p}},$$

wherein
$\beta_{DM-RS,1}^{PSSCH}$ is a power control factor of a physical sidelink shared channel (PSSCH), W is a quantity of sub-channels of a PSSCH bandwidth, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

9. The method according to claim 1, wherein a power control factor $\beta_{CSI-RS,1}$ of the CSI-RS satisfies the following relationship:

$$\beta_{CSI-RS,1} = \beta_{DM-RS,3}^{PSSCH} * \sqrt{\frac{n_{layer}^{PSSCH}}{Q_p}} \text{; and}$$

-continued $$\beta_{DM-RS,3}^{PSSCH} = \beta_{DM-RS,2}^{PSSCH} * \sqrt{\frac{W*Z}{W*(Z-Q_p)+Y*n_{layer}^{PSSCH}}},$$

wherein $\beta_{DM-RS,3}^{PSSCH}$ a power control factor of a physical sidelink shared channel (PSSCH) on a symbol PSSCH configured to transmit the CSI-RS, $\beta_{DM-RS,2}^{PSSCH}$ is a power control factor of the PSSCH on a symbol not configured to transmit the CSI-RS, W is a quantity of sub-channels of a PSSCH bandwidth, Z is a quantity of PRBs comprised in one sub-channel in the resource pool, Y is the quantity of sub-channels in the resource pool, Y≥W, $n_{layer}^{PSSCH}$ is a quantity of scheduled layers of the PSSCH, and $Q_p$ is a quantity of ports of the CSI-RS.

10. A communication method, comprising:
receiving a channel state information-reference signal (CSI-RS) from a first terminal device, wherein
a frequency-domain bandwidth of the CSI-RS is the same as a frequency-domain bandwidth of a resource pool to send the CSI-RS over the entire resource pool, the resource pool is a time-frequency resource set comprised in a sidelink (SL) bandwidth part (BWP), the resource pool comprises one or more consecutive sub-channels in a frequency domain, one sub-channel in the resource pool comprises one or more consecutive physical resource blocks (PRBs), and the resource pool is determined based on a periodic bitmap in a time domain; and
the CSI in the CSI-RS is carried in a media access control control element (MAC CE), and a quantity of bytes occupied by the MAC CE is related to a quantity of sub-channels in the resource pool.

11. The method according to claim 10, wherein the method further comprises:
receiving first indication information from the first terminal device, wherein the first indication information is used to indicate a second terminal device to send CSI, and the first indication information is comprised in $2^{nd}$ stage sidelink control information (SCI).

12. The method according to claim 11, wherein the first indication information is further used to indicate that the frequency-domain bandwidth of the CSI-RS is the same as the frequency-domain bandwidth of the resource pool.

13. The method according to claim 10, wherein the method further comprises:
receiving second indication information from the first terminal device, wherein the second indication information is used to indicate that the frequency-domain bandwidth of the CSI-RS is the same as the frequency-domain bandwidth of the resource pool.

14. The method according to claim 13, wherein the second indication information is comprised in radio resource control (RRC) signaling.

15. A communication apparatus, comprising:
a transceiver, configured to send a channel state information-reference signal (CSI-RS) to a second terminal device, wherein
a frequency-domain bandwidth of the CSI-RS is the same as a frequency-domain bandwidth of a resource pool to send the CSI-RS over the entire resource pool, the resource pool is a time-frequency resource set comprised in a sidelink (SL) bandwidth part (BWP), the resource pool comprises one or more consecutive sub-channels in a frequency domain, one sub-channel in the resource pool comprises one or more consecutive physical resource blocks (PRBs), and the resource pool is determined based on a periodic bitmap in a time domain; and
the CSI in the CSI-RS is carried in a media access control control element (MAC CE), and a quantity of bytes occupied by the MAC CE is related to a quantity of sub-channels in the resource pool.

16. The apparatus according to claim 15, wherein
the transceiver is further configured to send first indication information to the second terminal device, wherein the first indication information is used to indicate the second terminal device to send CSI, and the first indication information is comprised in $2^{nd}$ stage sidelink control information (SCI).

17. The apparatus according to claim 16, wherein the first indication information is further used to indicate that the frequency-domain bandwidth of the CSI-RS is the same as the frequency-domain bandwidth of the resource pool.

18. The apparatus according to claim 15, wherein the transceiver is further configured to send second indication information to the second terminal device, wherein the second indication information is used to indicate that the frequency-domain bandwidth of the CSI-RS is the same as the frequency-domain bandwidth of the resource pool.

19. The apparatus according to claim 18, wherein the second indication information is comprised in radio resource control (RRC) signaling.

* * * * *